US007115695B2

(12) United States Patent
Okamoto et al.

(10) Patent No.: US 7,115,695 B2
(45) Date of Patent: Oct. 3, 2006

(54) CURABLE COMPOSITION

(75) Inventors: Toshihiko Okamoto, Akashi (JP); Masashi Sakaguchi, Kako-gun (JP); Sadao Yukimoto, Kobe (JP); Katsuyu Wakabayashi, Kobe (JP); Junji Takase, Akashi (JP); Hiroshi Ando, Akashi (JP)

(73) Assignee: Kaneka Corporation, Osaka (JP)

( * ) Notice: Subject to any disclaimer, the term of this patent is extended or adjusted under 35 U.S.C. 154(b) by 84 days.

(21) Appl. No.: 10/482,872

(22) PCT Filed: Jul. 5, 2002

(86) PCT No.: PCT/JP02/06877

§ 371 (c)(1),
(2), (4) Date: Jan. 6, 2004

(87) PCT Pub. No.: WO03/011978

PCT Pub. Date: Feb. 13, 2003

(65) Prior Publication Data

US 2004/0198885 A1 Oct. 7, 2004

(30) Foreign Application Priority Data

| Jul. 27, 2001 | (JP) | ............................. 2001-226971 |
| Sep. 27, 2001 | (JP) | ............................. 2001-295770 |
| Nov. 6, 2001 | (JP) | ............................. 2001-340999 |

(51) Int. Cl.
*C08G 77/60* (2006.01)
(52) U.S. Cl. ............................ 528/14; 528/18; 528/19; 528/21; 528/35
(58) Field of Classification Search ................... 528/21
See application file for complete search history.

(56) References Cited

U.S. PATENT DOCUMENTS

| 3,979,180 A | * | 9/1976 | Lorand ........................ 524/83 |
| 4,323,488 A | * | 4/1982 | Takago et al. ................ 528/32 |
| 4,472,551 A | | 9/1984 | White et al. |
| 4,507,469 A | | 3/1985 | Mita et al. |
| 5,130,401 A | * | 7/1992 | Arai et al. .................... 528/33 |
| 5,134,181 A | * | 7/1992 | Masina ........................ 524/100 |
| 5,319,036 A | * | 6/1994 | DeMarco .................... 525/366 |
| 5,502,096 A | * | 3/1996 | Kimura et al. .............. 524/356 |
| 6,017,413 A | * | 1/2000 | Franklin et al. ......... 156/304.2 |
| 6,054,549 A | * | 4/2000 | Bahadur et al. .............. 528/29 |
| 6,232,376 B1 | * | 5/2001 | Tsukada et al. .............. 524/99 |

FOREIGN PATENT DOCUMENTS

| BE | 1669672 | * | 5/1971 |
| EP | 0 252 372 | * | 1/1988 |
| EP | 0 290 388 | | 11/1988 |
| EP | 0 473 793 A1 | | 3/1992 |
| EP | 0 518 142 | * | 12/1992 |
| EP | 290388 | * | 12/1997 |
| EP | 0 950 685 | * | 10/1999 |
| GB | 1195098 | | 6/1970 |
| JP | 2000-129126 | | 5/2000 |
| JP | 2000-234064 | | 8/2000 |
| JP | 2000-313814 | | 11/2000 |
| JP | 2002-212451 | | 7/2002 |
| WO | WO 91/13928 | | 9/1991 |

* cited by examiner

*Primary Examiner*—Marc S. Zimmer
(74) *Attorney, Agent, or Firm*—Kenyon & Kenyon LLP

(57) ABSTRACT

A curable composition is characterized by comprising an organic polymer having at least one silicon-containing group which has a hydroxy or hydrolyzable group bonded to the silicon atom and which is crosslinkable by forming siloxane bonds, and a specific metal salt of a carboxylic acid. The composition ensures practical curability and recovery properties and has mechanical properties including high strength and high elongation.

8 Claims, No Drawings

CURABLE COMPOSITION

This application is a 371 national phase application of PCT/JP02/06877 filed on 5 Jul. 2002, claiming priority to JP 2001-226971, filed on 27 Jul. 2001, JP 2001-295770 filed on 27 Sep. 2001 and JP 2001-340999 filed 6 Nov. 2001, the contents of which are incorporated herein by reference in their entirety.

1. TECHNICAL FIELD

The present invention relates to a curable composition comprising an organic polymer containing a silicon-containing group which has a hydroxyl or hydrolyzable group bonded to the silicon atom and which is crosslinkable by forming siloxane bonds (hereinafter referred to as a "reactive silicon group").

2. BACKGROUND ART

It has been known that an organic polymer having at least one reactive silicon group has such an interesting property that it is crosslinked as a result of the formation of siloxane bonds accompanying the hydrolysis reaction of the reactive silicon group in the presence of moisture even at room temperature, thus obtaining a rubber-like cured article.

Among these polymers having a reactive silicon group, a polyoxyalkylene polymer and a polyisobutylene polymer are disclosed in Japanese Kokai Publication No. Sho-52-73998, Japanese Kokai Publication No. Hei-5-125272, Japanese Kokai Publication No. Hei-3-72527, Japanese Kokai Publication No. Sho-63-6003, Japanese Kokai Publication No. Sho-63-6041, Japanese Kokai Publication No. Hei-1-38407 and Japanese Kokai Publication No. Hei-8-231758. Particularly, the polyoxyalkylene polymer and the polyisobutylene polymer have already been produced industrially and widely used in applications such as sealing materials, adhesives, and paints.

In case the organic polymer is a saturated hydrocarbon polymer, the cured article is useful as sealing materials for buildings and sealing materials for double glazings because it is excellent in heat resistance, water resistance and weatherability. Furthermore, an isobutylene polymer containing a repeating unit originating in isobutylene in the total amount of 50% by weight or more is suited for use as moisture-proofing sealing materials because it is excellent in low moisture permeability and low gas permeability.

Since these sealing materials are generally used for the purpose of imparting watertightness and airtightness by filling into the joint or clearance between various members, its conformability to the portion to be applied for a long time is very important and it is required to exhibit sufficient elongation and strength.

In case such an organic polymer having a reactive silicon group is cured with crosslinking, a silanol condensation catalyst is used and also an amine compound such as laurylamine is often used as a promoter for the purpose of promoting the condensation reaction. As the silanol condensation catalyst, tin catalysts, for example, divalent tin such as tin octylate (2-ethylhexanoate) and tetravalent tin such as dibutyltin bisacetylacetonate are widely used. In case the portion where the sealing material is installed moves drastically, divalent tin is often used because a cured article having recovery properties is obtained.

However, in case divalent tin such as tin octylate is used in combination with a promoter such as amine compound, as a curing catalyst of the component (A), the resulting cured article is sometimes insufficient in strength and elongation, and thus it is required to further improve physical properties.

Almost all of the latter tetravalent tin catalysts are dibutyltin type catalysts and are widely used because the resulting cured article has relaxation property, i.e. property capable of following a long-term change in stress applied from the outside, and rapid curability and also it can be applied as a curing catalyst of a one-part curable composition. However, since toxicity becomes a problem when a small amount of tributyltin is contained therein, it is required to develop a tin-free silanol condensation catalyst.

In Japanese Kokoku Publication No. Sho-35-2795, Japanese Kokoku Publication No. Sho-32-3742, Japanese Kokoku Publication No. Sho-35-9639, and Japanese Kokoku Publication No. Sho-37-3271, carboxylic acid salts of tin and various tin-free carboxylic acid metal salts are disclosed as a curing catalyst of an organopolysiloxane composition. As an example wherein a tin-free carboxylic acid metal salt is used as a curing catalyst of a composition containing an organic polymer having a reactive silicon group, bismuth carboxylate (Japanese Kokai Publication No. Hei-5-39428 and Japanese Kokai Publication No. Hei-9-12860) and cerium carboxylate (Japanese Kokai Publication No. 2000-313814) are listed. However, there has never been studied intensively about various carboxylic acid metal salts.

DISCLOSURE OF THE INVENTION

An object of the present invention is to provide a curable composition, which is useful as moistureproof sealing materials and adhesives used in sealing materials for buildings, sealing materials for double glazings, and electrical and electronic parts that require high durability, because the curable composition has curability suited for practical use and the resulting cured article has good recovery properties and exhibits excellent strength and elongation.

The present inventors have studied so as to achieve the above object and found that it is possible to exhibit physical properties such as high strength and high elongation as compared with the case of using tin octylate as the curing catalyst while maintaining proper curability and recovery properties by using one of more carboxylic acid metal salts selected from calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate as the curing agent of the component (A), and thus the present invention has been completed.

The present invention is directed to a curable composition comprising components (A) and (B) described below; (A) an organic polymer containing at least one silicon-containing group which has a hydroxyl or hydrolyzable group bonded to the silicon atom and which is crosslinkable by forming siloxane bonds, and (B) one or more carboxylic acid metal salts selected from the group consisting of calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate.

Furthermore, the present invention is directed to aforementioned curable composition, which further contains a component (C), an amine compound, as a main ingredient.

As preferable embodiment, the present invention is directed to any one of aforementioned curable compounds, wherein the organic polymer as the component (A) has a number average molecular weight within a range from 500 to 50,000 and also has one or more hydrolyzable silyl groups represented by the general formula (1):

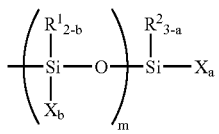
(1)

wherein $R^1$ and $R^2$ each independently represents an alkyl group having 1 to 20 carbon atoms, an aryl group having 6 to 20 carbon atoms, an aralkyl group having 7 to 20 carbon atoms, or a triorganosiloxy group represented by $(R')_3SiO$— (R' each independently represents a substituted or non-substituted hydrocarbon group having 1 to 20 carbon atoms); X each independently represents a hydroxyl or hydrolyzable group; a represents 0, 1, 2 or 3; b represents 0, 1 or 2, and a and b do not become 0 simultaneously; and m is 0 or an integer of 1 to 19, per molecule in the main chain ends and/or the side chains.

As more preferable embodiment, the present invention is directed to aforementioned curable composition, wherein X is an alkoxy group.

As more preferable embodiment, the present invention is directed to any one of aforementioned curable compositions, wherein the organic polymer as the component (A) is a polyoxyalkylene polymer and/or a saturated hydrocarbon polymer.

As more preferable embodiment, the present invention is directed to aforementioned curable composition, wherein the saturated hydrocarbon polymer contains a repeating unit originating in isobutylene in the total amount of 50% by weight or more.

As more preferable embodiment, the present invention is directed to any one of aforementioned curable compositions, wherein calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate as the component (B) respectively contain, as the main ingredient, carboxylic acid metal salts represented by the general formulas (2) to (12):

$$Ca(OCOR)_2 \quad (2)$$

$$V(OCOR)_3 \quad (3)$$

$$Fe(OCOR)_2 \quad (4)$$

$$Fe(OCOR)_3 \quad (5)$$

$$Ti(OCOR)_4 \quad (6)$$

$$K(OCOR) \quad (7)$$

$$Ba(OCOR)_2 \quad (8)$$

$$Mn(OCOR)_2 \quad (9)$$

$$Ni(OCOR)_2 \quad (10)$$

$$Co(OCOR)_2 \quad (11)$$

$$Zr(O)(OCOR)_2 \quad (12)$$

wherein R represents a substituted or non-substituted hydrocarbon group and may contain a carbon-carbon double bond.

As more preferable embodiment, the present invention is directed to any one of aforementioned curable compositions, wherein the carboxylic acid metal salt as the component (B) is a carboxylic acid metal salt having an acid radical of carboxylic acid which has a melting point of 65° C. or lower.

As more preferable embodiment, the present invention is directed to any one of aforementioned curable compositions, wherein the carboxylic acid metal salt as the component (B) is a carboxylic acid metal salt having an acid radical of carboxylic acid which contains carbon of a carbonyl group and has 2 to 17 carbon atoms.

As more preferable embodiment, the present invention is directed to any one of aforementioned curable compositions, wherein the carboxylic acid metal salt as the component (B) is a metal salt of a carboxylic acid group-containing compound selected from octylic acid, 2-ethylhexanoic acid, neodecanoic acid, oleic acid and naphthenic acid.

As more preferable embodiment, the present invention is directed to any one of aforementioned curable compositions, which contains the component (B) in the amount of 0.005 to 5 parts by weight in terms of a metallic element contained in the component (B) based on 100 parts by weight of the component (A).

As more preferable embodiment, the present invention is directed to any one of aforementioned curable compositions, which contains the component (B) in the amount of 0.005 to 5 parts by weight in terms of a metallic element contained in the component (B) based on 100 parts by weight of the component (A), and the component (C) in the amount of 0.01 to 20 parts by weight.

The present invention will be described in detail below.

The main chain skeleton of the organic polymer having a reactive silicon group used in the present invention is not specifically limited and those having various main chain skeletons can be used.

Specific examples of the organic polymer include polyoxyalkylene polymer such as polyoxyethylene, polyoxypropylene, polyoxybutylene, polyoxytetramethylene, polyoxyethylene-polyoxypropylene copolymer, or polyoxypropylene-polyoxybutylene copolymer; ethylene-propylene copolymer, polyisobutylene, copolymer of isobutylene and isoprene, polychloroprene, polyisoprene, copolyme of isoprene or butadiene and acrylonitrile and/or styrene, polybutadiene, or hydrocarbon polymer such as hydrogenated polyolefin polymer produced by hydrogenating these polyolefin polymers; polyester polymer produced by condensation of dibasic acid such as adipic acid and glycol, or ring-opening polymerization of lactones; polyacrylic acid ester produced by radical polymerization of a monomer such as ethyl acrylate or butyl acrylate, vinyl polymer, for example, acrylic acid ester copolymer of acrylic acid ester such as ethyl acrylate or butyl acrylate and vinyl acetate, acrylonitrile, methyl methacrylate or styrene; graft polymer produced by polymerizing the above organic polymer with a vinyl monomer; polysulfide polymer; polyamide polymer such as nylon 6 produced by ring-opening polymerization of ε-caprolactam, nylon 6.6 produced by polycondensation of hexamethylenediamine and adipic acid, nylon 6.10 produced by polycondensation of hexamethylenediamine and sebacic acid, nylon 11 produced by polycondensation of ε-aminoundecanoic acid, nylon 12 produced by ring-opening polymerization of ε-aminolaurolactam, or copolymer nylon containing two or more components among the above nylons; polycarbonate polymer produced by polycondensation of bisphenol A and carbonyl chloride; and diallyl phthalate polymer.

Among these polymers having a main chain skeleton, polyoxyalkylene polymer, hydrocarbon polymer, polyester polymer, vinyl copolymer and polycarbonate polymer are preferable because they are available and produced with ease. Furthermore, saturated hydrocarbon polymer, polyoxyalkylene polymer and vinyl copolymer are particularly preferable because they have comparatively low glass transition temperature and the resulting cured article is excellent in cold resistance.

Examples of the saturated hydrocarbon polymer having a reactive silicon group used in present invention include reactive silicon group-containing saturated hydrocarbon polymers derived from saturated hydrocarbon polymers such as polyisobutylene, hydrogenated polybutadiene and hydrogenated polyisoprene.

The reactive silicon group contained in the organic polymer having a reactive silicon group is a group which has a hydroxyl or hydrolyzable group bonded to the silicon atom and which is crosslinkable by formation of siloxane bonds, that is the reaction accelerated by a carboxylic acid metal salt as the component (B).

The reactive silicon group includes a group represented by the general formula (1):

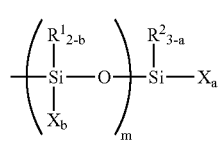

(1)

wherein $R^1$ and $R^2$ each independently represents an alkyl group having 1 to 20 carbon atoms, an aryl group having 6 to 20 carbon atoms, an aralkyl group having 7 to 20 carbon atoms, or a triorganosiloxy group represented by $(R')_3SiO$— (R' each independently represents a substituted or non-substituted hydrocarbon group having 1 to 20 carbon atoms); X each independently represents a hydroxyl or hydrolyzable group; a represents 0, 1, 2 or 3; b represents 0, 1 or 2, and a and b do not become 0 simultaneously; and m is 0 or an integer of 1 to 19.

The hydrolyzable group is not specifically limited and may be a conventionally known hydrolyzable group. Specific examples thereof include commonly used groups such as hydrogen atom, halogen atom, alkoxy group, acyloxy group, ketoximate group, amino group, amide group, acid amide group, aminooxy group, mercapto group, and alkenyloxy group.

Among these groups, alkoxy group, amide group and aminooxy group are preferable and alkoxy group is particularly preferable in view of mild hydrolyzability and easy handling.

One to three hydrolyzable or hydroxyl groups can be bonded to one silicon atom and (a+Σb) is preferably within a range from 1 to 5. In case two or more of hydrolyzable or hydroxyl groups are bonded in the reactive silicon group, they may be the same or different.

The number of silicon atoms which form a reactive silicon group is at least one, but is preferably 20 or less in case of a silicon atom combined through the siloxane bond.

Particularly preferred one is a reactive silicon group represented by the general formula (13):

(13)

wherein $R^2$ and X are as defined above, and c is an integer of 1 to 3 in view of availability.

In case c is 3 in the general formulas (13), specific examples of X include trialkoxysilyl group such as methoxy group, ethoxy group, propoxy group, or isopropoxy group. In case c is not 3 in the general formulas (13), specific examples of $R^2$ include alkyl group such as methyl group or ethyl group, cycloalkyl group such as cyclohexyl group, aryl group such as phenyl group, aralkyl group such as benzyl group, and triorganosiloxy group represented by $(R')_3SiO$— wherein R' is a methyl group or a phenyl group. Among these groups, a methyl group is particularly preferable because the hydrolysis reaction has high activity.

More specific examples of the reactive silicon group include trimethoxysilyl group, triethoxysilyl group, triisopropoxysilyl group, dimethoxymethylsilyl group, diethoxymethylsilyl group and diisopropoxymethylsilyl group. A trimethoxysilyl group is particularly preferable because it has high activity and can reduce the amount of the carboxylic acid metal salt as the component (B).

The reactive silicon group may be introduced by a known method. Examples of the method include the followings.

(i) An organic polymer having a functional group such as hydroxyl group in the molecule is reacted with an organic compound which has an active group having reactivity with the functional group and also has an unsaturated group to obtain an organic polymer having an unsaturated group. Alternatively, an unsaturated group-containing organic polymer is obtained by copolymerization with an unsaturated group-containing epoxy compound. Then, the resulting reaction product is hydrosilylated by reacting with hydrosilane having a reactive silicon group.

(ii) An organic polymer having an unsaturated group obtained in the same manner as in the method (i) is reacted with a compound having a mercapto group and a reactive silicon group.

(iii) An organic polymer having a functional group such as hydroxyl group, epoxy group or isocyanate group in the molecule is reacted with a compound which has a functional group having reactivity with the functional group and also has a reactive silicon group.

Among these methods, preferred is a method of reacting a polymer having a hydroxyl group at the ends with a compound having an isocyanate group and a reactive silicon group among the methods (i) and (iii) because the production cost decreases.

Specific examples of the hydrosilane compound used in the method (i) include, but are not limited to, halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane and phenyldiacetoxysilane; and ketoximatesilanes such as bis(dimethylketoximate)methylsilane and bis(cyclohexylketoximate)methylsilane. Among these compounds, halogenated silanes and alkoxysilanes are particularly preferable because of excellent availability and hydrolyzability.

The synthesis method (ii) includes, but is not limited to, a method of introducing a compound having a mercapto group and a reactive silicon group into the unsaturated bond portion of an organic polymer by the radical addition reaction in the presence of a radical initiator and/or a radical generation source. Specific examples of the compound having a mercapto group and a reactive silicon group include, but are not limited to, γ-mercaptopropyltrimethoxysilane, γ-mercaptopropylmethyldimethoxysilane, γ-mercaptopropyltriethoxysilane, and γ-mercaptopropylmethyldiethoxysilane.

The method of reacting a polymer having a hydroxyl group at the ends with a compound having an isocyanate group and a reactive silicon group among the synthesis method (iii) includes, but is not limited to, a method disclosed in Japanese Kokai Publication No. Hei-3-47825. Specific examples of the compound having an isocyanate group and a reactive silicon group include, but are not limited to, γ-isocyanatepropyltrimethoxysilane, γ-isocyanatepropylmethyldimethoxysilane, γ-isocyanatepropyltriethoxysilane, and γ-isocyanatepropylmethyldiethoxysilane.

In a silane compound wherein three hydrolyzable groups are bonded to one silicon atom of trimethoxysilane, a disproportionation reaction proceeds sometimes. When the disproportionation reaction proceeds, considerably risky compound such as dimethoxysilane is produced. However, such a disproportionation reaction does not proceed in case of γ-mercaptopropyltrimethoxysilane and γ-isocyanatepropyltrimethoxysilane. Therefore, when using, as the silicon-containing group, a group wherein three hydrolyzable groups such as trimethoxysilyl group are bonded to one silicon atom, the synthesis method (ii) or (iii) is preferably used.

The number average molecular weight of the organic polymer as the component (A) is preferably from about 500 to 50,000, and particularly preferably from about 1,000 to 30,000, relative to polystyrene standards in GPC (gel permeation chromatography) because the organic polymer is in the form of liquid with proper fluidity and is handled with ease. When the number average molecular weight is less than 500, sufficient rubber elasticity can not be obtained. On the other hand, when the number average molecular weight exceeds 50,000, it is hard to handle because of poor fluidity at normal temperature and, therefore, it is not preferable.

The number of reactive silicon groups in a molecule of the organic polymer as the component (A) is 1 or more, and preferably from 1.1 to 5. When the number of reactive silicon groups in the molecule is less than 1, satisfactory rubber elasticity may not obtained because of poor curability. On the other hand, when the number of reactive silicon groups exceeds 5, rubber elasticity becomes poor and, therefore, it is not preferable.

The reactive silicon group may exist in the main chain ends and/or side chains of the organic polymer. The reactive silicon group preferably exist in the main chain ends because the amount of effective network chains of the organic polymer component contained in the finally formed cured article increases and a rubber-like cured article having high strength and high elongation is easily obtained.

The polyoxyalkylene polymer is essentially a polymer having a repeating unit represented by the general formula (14):

$$—R^3—O— \quad (14)$$

wherein $R^3$ is a divalent organic group and is a linear or branched alkylene group having 1 to 14 carbon atoms, and $R^3$ in the general formulas (14) is preferably a linear or branched alkylene group which has 1 to 14 carbon atoms, and preferably 2 to 4 carbon atoms. Specific examples of the repeating unit represented by the general formula (14) include:

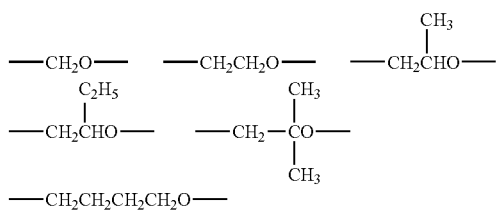

The main chain skeleton of the polyoxyalkylene polymer may be composed of only one kind of a repeating unit, or two or more kinds of repeating units. When used in sealants, a polyoxyalkylene polymer composed of a polymer containing a polyoxypropylene polymer as a main component are preferable because it is amorphous and has comparatively low viscosity.

Examples of the method of synthesizing a polyoxyalkylene polymer include, but are not limited to, a polymerization method using an alkali catalyst such as KOH, a polymerization method using a transition metal compound-porphyrin complex catalyst such as complex obtained by reacting an organoaluminum compound and porphyrin disclosed in Japanese Kokai Publication No. Sho-61-215623, a polymerization method using a composite metal cyanide complex catalyst disclosed in Japanese Kokoku Publication No. Sho-46-27250, Japanese Kokoku Publication No. Sho-59-15336, U.S. Pat. No. 3,278,457, U.S. Pat. No. 3,278,458, U.S. Pat. No. 3,278,459, U.S. Pat. No. 3,427,256, U.S. Pat. No. 3,427,334 and U.S. Pat. No. 3,427,335, a polymerization method using a polyphosphazene salt disclosed in Japanese Kokai Publication No. Hei-10-273512; and a polymerization method using a catalyst composed of a phosphazene compound disclosed in Japanese Kokai Publication No. Hei-11-060722.

The main chain skeleton of the polyoxyalkylene polymer may contain other components such as urethane bond component as far as the effect of the present invention is not adversely affected.

Examples of the urethane bond component include, but are not limited to, those obtained by reacting a polyisocyanate compound, for example, aromatic polyisocyanate such as tolylene diisocyanate, diphenylmethane diisocyanate, or xylylene diisocyanate, or aliphatic polyisocyanate such as isophorone diisocyanate, or hexamethylene diisocyanate, with polyol having a repeating unit of the general formula (14).

The method of producing a polyoxyalkylene polymer having a reactive silicon group is disclosed in the following publications such as Japanese Kokoku Publication No. Sho-45-36319, Japanese Kokoku Publication No. Sho-46-12154, Japanese Kokai Publication No. Sho-50-156599, Japanese Kokai Publication No. Sho-54-6096, Japanese Kokai Publication No. Sho-55-13767, Japanese Kokai Publication No. Sho-55-13468, Japanese Kokai Publication No. Sho-57-164123, Japanese Kokoku Publication No. Hei-3-2450, U.S. Pat. No. 3,632,557, U.S. Pat. No. 4,345,053, U.S. Pat. No. 4,366,307, and U.S. Pat. No. 4,960,844, or disclosed in the following publications such as Japanese Kokai Publication No. Sho-61-197631, Japanese Kokai Publication No. Sho-61-215622, Japanese Kokai Publication No. Sho-61-215623, Japanese Kokai Publication No. Sho-61-218632, Japanese Kokai Publication No. Hei-3-72527, Japanese Kokai Publication No. Hei-3-47825, and Japanese Kokai Publication No. Hei-8-231707. A polyoxyalkylene polymer, which has high molecular weight, for example, a number average molecular weight of 6,000 or more and Mw/Mn (a ratio of a weight average molecular weight to a number average molecular weight) of 1.6 or less and also has narrow molecular weight distribution, can be preferably used, but is not limited thereto.

These polyoxyalkylene polymers having a reactive silicon group may be used alone, or two or more kinds of them may be used in combination.

The polymer constituting a skeleton of a saturated hydrocarbon polymer having a reactive silicon group used in the present invention can be obtained by a method (1) of polymerizing a material containing an olefinic compound having 1 to 6 carbon atoms such as ethylene, propylene, 1-butene or isobutylene as a main component, or a method (2) of homopolymerizing a diene compound such as butadiene or isoprene or copolymerizing the diene compound with the above olefinic compound and hydrogenating the resulting copolymer. The isobutylene polymer and the hydrogenated polybutadiene polymer are preferable because a functional group is easily introduced into the ends and the molecular weight is easily controlled, and also the number of terminal functional groups can increase.

Regarding the isobutylene polymer, all monomer units may be composed of an isobutylene unit and a monomer unit having copolymerizability with isobutylene may be preferably contained in the content of 50% by weight or less, more preferably 30% by weight or less, and particularly 10% by weight or less, based on the isobutylene. When the content of the monomer unit having copolymerizability with isobutylene exceeds 50% by weight in the isobutylene polymer, it is not preferable because physical properties such as excellent weatherability, excellent heat resistance and low moisture permeability originating in an isobutylene skeleton are not sufficiently achieved.

Examples of the monomer component include olefin having 4 to 12 carbon atoms, vinyl ether, aromatic vinyl compound, vinylsilanes, and allylsilanes. Examples of the copolymer component include 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, and γ-methacryloyloxypropylmethyldimethoxysilane.

When using vinylsilanes and allylsilanes among these compounds as the monomer unit having copolymerizability with isobutylene, the silicon content increases and the number of groups capable of serving as a coupling agent increases, and thus adhesion of the resulting composition is improved.

The hydrogenated polybutadiene polymer and the other saturated hydrocarbon polymer may contain the other monomer unit, in addition to the monomer unit as the main component, similar to the case of the isobutylene polymer.

The saturated hydrocarbon polymer having a reactive silicon group used in the present invention may contain a monomer unit capable of remaining a double bond after polymerization, for example, a polyene compound such as butadiene or isoprene in a small amount of preferably 10% by weight or less, more preferably 5% by weight or less, and particularly preferably 1% by weight or less, as far as the object of the present invention can be achieved.

These saturated hydrocarbon polymers having a reactive silicon group can be used alone, or two or more kinds of them can be used in combination.

Then, the method of producing a saturated hydrocarbon polymer having a reactive silicon group will be described below.

Among isobutylene polymers having a silicon group, an isobutylene polymer having a reactive silicon group in the molecular chain ends can be produced by a terminal functional type isobutylene polymer, preferably an all-terminal functional type isobutylene polymer obtained by a polymerization method called as an inifer method (cationic polymerization method using a specific compound which simultaneously serves as an initiator and a chain transfer agent). The saturated hydrocarbon polymer having a reactive silicon group can be obtained, for example, by obtaining polyisobutylene having an unsaturated group in the ends by the dehydrohalogenation reaction of the ends of a polymer having a tertiary carbon-chlorine bond obtained by the polymerization reaction, or the reaction of the ends of a polymer having a tertiary carbon-chlorine bond and allyltrimethylsilane, and subjecting to the reaction of adding a hydrosilane compound represented by the general formulas (15):

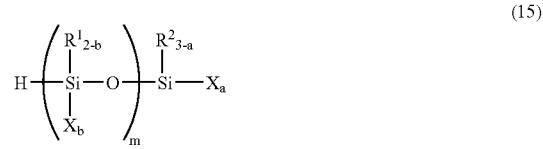

wherein $R^1$, $R^2$, X, m, a and b are as defined above (this compound is a compound wherein a hydrogen atom is bonded to a group represented by the general formula (1)), preferably a hydrosilane compound represented by the general formula (16):

wherein $R^2$, X and c are as defined above, using a platinum catalyst (hydrosilylation reaction).

Examples of the hydrosilane compound include, but are not limited to, halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane and phenyldiacetoxysilane; and ketoximatesilanes such as bis(dimethylketoximate)methylsilane and bis(cyclohexylketoximate)methylsilane. Among these compounds, halogenated silanes and alkoxysilanes are preferably in view of availability.

These production methods are described in the following publications, for example, Japanese Kokoku Publication No. Hei-4-69659, Japanese Kokoku Publication No. Hei-7-108928, Japanese Kokai Publication No. Sho-63-254149, Japanese Kokai Publication No. Sho-64-22904, and Japanese Patent No. 2539445.

The isobutylene polymer having a reactive silicon group in the side chains of the molecular chain is produced by copolymerizing a monomer containing isobutylene with vinylsilanes or allylsilanes having a reactive silicon group.

In the polymerization reaction of producing an isobutylene polymer having a reactive silicon group in the molecular chain ends, vinylsilanes or allylsilanes having a reactive silicon group are copolymerized, in addition to the isobutylene monomer as the main component, and a reactive silicon group is introduced into the ends, thereby to produce an isobutylene polymer having a reactive silicon group in the ends and the side chains of the molecular chain.

Examples of the vinylsilanes or allylsilanes having a reactive silicon group include vinyltrichlorosilane, vinylmethyldichlorosilane, vinyldimethylchlorosilane, vinyldimethylmethoxysilane, divinyldichlorosilane, divinyldimethoxysilane, allyltrichlorosilane, allylmethyldichlorosilane, allyldimethylchlorosilane, allyldimethylmethoxysilane, diallyldichlorosilane, diallyldimethoxysilane, γ-methacryloyloxypropyltrimethoxysilane, and γ-methacryloyloxypropylmethyldimethoxysilane.

In the present invention, the saturated hydrocarbon polymer having a reactive silicon group includes a hydrogenated polybutadiene polymer having a reactive silicon group. The hydrogenated polybutadiene polymer having a reactive silicon group can be obtained by the hydrosilylation reaction of a hydrogenated polybutadiene polymer having an olefin group. The hydrogenated polybutadiene polymer having a terminal olefin group can be obtained by converting a hydroxyl group of the terminal hydroxy hydrogenated polybutadiene polymer into an oxymetal group such as —ONa or —OK, and reacting with an organohalogen compound represented by the general formula (17):

$$CH_2=CH-R^4-Y \qquad (17)$$

wherein Y is a halogen atom such as chlorine atom, bromine atom, or iodine atom, and $R^4$ is a divalent organic group represented by —$R^5$—, —$R^5$—OCO— or —$R^5$—CO— ($R^5$ is a divalent hydrocarbon group having 1 to 20 carbon atoms and is preferably an alkylene group, a cycloalkylene group, an arylene group or an aralkylene group) and is particularly preferably a divalent group selected from —$CH_2$— and —R"—$C_6H_4$—$CH_2$— (R" is a hydrocarbon group having 1 to 10 carbon atoms).

The method of converting a terminal hydroxyl group of the hydroxy terminated-hydrogenated polybutadiene polymer into an oxymetal group includes a method of reacting with an alkali metal such as Na or K; a metal halide such as NaH; a metal alkoxide such as $NaOCH_3$; and an alkali hydroxide such as NaOH or KOH.

By the above method, a olefin terminated-hydrogenated polybutadiene polymer having almost the same molecular weight as that of the hydroxy terminated-hydrogenated polybutadiene polymer used as a starting material can be obtained. In case of producing a polymer having higher molecular weight, the molecular weight can be increased by reacting with a polyvalent organohalogen compound having two or more halogen atoms in a molecule, such as methylene chloride, bis(chloromethyl)benzene or bis(chloromethyl) ether before reacting with the organohalogen compound represented by the general formula (17). Then, the resulting product is reacted with the organohalogen compound represented by the general formula (17) to obtain a hydrogenated polybutadiene polymer which has higher molecular weight and also has an olefin group in the ends.

Specific examples of the organohalogen compound represented by the general formula (17) include, but are not limited to, allyl chloride, allyl bromide, vinyl(chloromethyl) benzene, allyl(chloromethyl)benzene, allyl(bromomethyl) benzene, allyl(chloromethyl)ether, allyl(chloromethoxy) benzene, 1-butenyl(chloromethyl)ether, 1-hexenyl (chloromethoxy)benzene, and allyloxy (chloromethyl) benzene. Among these compounds, allyl chloride is preferable because it is cheap and is easily reacted.

The reactive silicon group is introduced into the olefin terminated-hydrogenated polybutadiene polymer by adding a hydrosilane compound using a platinum catalyst in the same manner as in case of an isobutylene polymer having a reactive silicon group in the molecular chain ends.

As described above, when the saturated hydrocarbon polymer having a reactive silicon group does not substantially contain an unsaturated bond which is not an aromatic ring, weatherability is remarkably improved as compared with a sealing material composed of a conventional rubber polymer such as organic polymer having an unsaturated bond or oxyalkylene polymer. Since the polymer is a hydrocarbon polymer, a cured article having excellent water resistance and low moisture permeability can be obtained.

These organic polymers having a reactive silicon group may be used alone, or two or more kinds of them may be used in combination. Specifically, an organic polymer obtained by blending two or more kinds selected from the group consisting of polyoxyalkylene polymer having a reactive silicon group, saturated hydrocarbon polymer having a reactive silicon group and vinyl polymer having a reactive silicon group can also be used.

The method of producing an organic polymer by blending a polyoxyalkylene polymer having a reactive silicon group with a vinyl polymer having a reactive silicon group is disclosed in Japanese Kokai Publication No. Sho-59-122541, Japanese Kokai Publication No. Sho-63-112642, Japanese Kokai Publication No. Hei-6-172631, and Japanese Kokai Publication No. Hei-11-116763, but is not limited thereto.

Preferable specific example thereof is a method of producing an organic polymer by blending a copolymer having a reactive silicon group wherein its molecular chain is substantially composed of a (meth)acrylic acid ester monomer unit comprising an alkyl group having 1 to 8 carbon atoms represented by the general formula (18):

(18)

wherein $R^6$ represents a hydrogen atom or a methyl group, and $R^7$ represents an alkyl group having 1 to 8 carbon atoms, and a (meth)acrylic acid ester monomer unit comprising an alkyl group having 10 or more carbon atoms represented by the general formula (19):

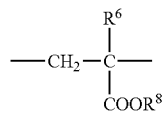

$$-CH_2-\underset{\underset{COOR^8}{|}}{\overset{\overset{R^6}{|}}{C}}-$$ (19)

wherein $R^6$ is as defined above, and $R^8$ represents an alkyl group having 10 or more carbon atoms, with a polyoxyalkylene polymer having a reactive silicon group. As used herein, (meth)acrylic acid means acrylic acid and/or methacrylic acid.

$R^7$ in the general formula (18) includes an alkyl group which has 1 to 8 carbon atoms, preferably 1 to 4 carbon atoms, and more preferably 1 to 2 carbon atoms, such as methyl group, ethyl group, propyl group, n-butyl group, t-butyl group, or 2-ethylhexyl group. Alkyl groups as for $R^7$ may be used alone, or two or more kinds of them may be used in combination.

$R^8$ in the general formula (19) includes a long-chain alkyl group which has 10 or more carbon atoms, usually 10 to 30 carbon atoms, and preferably 10 to 20 carbon atoms, such as lauryl group, tridecyl group, cetyl group, stearyl group, or behenyl group. Alkyl groups as for $R^8$ may be used alone, or two or more kinds of them may be used in combination, similar to the case of $R^7$.

The main chain of the vinyl copolymer is substantially composed of monomer units of the formulas (18) and (19). As used herein, the term "substantially" means that the total amount of the monomer units of the formulas (18) and (19) present in the copolymer exceeds 50% by weight. The total amount of the monomer units of the formulas (18) and (19) is preferably 70% by weight or more.

A ratio of the monomer unit of the formula (18) to the monomer unit of the formula (19) is preferably from 95:5 to 40:60, and more preferably from 90:10 to 60:40, in terms of a weight ratio in view of compatibility with the polyoxyalkylene polymer.

Examples of the monomer unit other than the monomer units of the formulas (18) and (19), which may be contained in the copolymer, include monomer having a carboxylic acid group, such as acrylic acid or methacrylic acid, monomer having an amide group, such as acrylamide, methacrylamide, N-methylolacrylamide, or N-methylolmethacrylamide, monomer having an epoxy group, such as glycidyl acrylate or glycidyl methacrylate, and monomer having an amino group, such as diethylaminoethyl acrylate, diethylaminoethyl methacrylate, or aminoethylvinyl ether; and monomer units originating in acrylonitrile, styrene, a-methylstyrene, alkyl vinyl ether, vinyl chloride, vinyl acetate, vinyl propionate, and ethylene.

The organic polymer obtained by blending a saturated hydrocarbon polymer having a reactive silicon group with a vinyl polymer having a reactive silicon group is disclosed in Japanese Kokai Publication No. Hei-1-168764, and Japanese Kokai Publication No. 2000-186176, but is not limited thereto.

As the method of producing an organic polymer by further blending a vinyl polymer having a reactive silicon group, a method of polymerizing a (meth)acrylic acid ester monomer in the presence of an organic polymer having a reactive silicon group can also be employed. This method is specifically disclosed in the following publications such as Japanese Kokai Publication No. Sho-59-78223, Japanese Kokai Publication No. Sho-59-168014, Japanese Kokai Publication No. Sho-60-228516, and Japanese Kokai Publication No. Sho-60-228517, but is not limited thereto.

One or more kinds of carboxylic acid metal salts selected from the group consisting of calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate, which are used as the component (B) in the curable composition of the present invention, serve as so-called a silanol condensation catalyst capable of forming siloxane bonds from a hydroxyl group or hydrolyzable group bonded to a silicon atom contained in an organic polymer as the component (A) of the present invention.

Among these carboxylic acid metal salts, calcium carboxylate, vanadium carboxylate, iron carboxylate, titanium carboxylate, potassium carboxylate, barium carboxylate, manganese carboxylate and zirconium carboxylate are preferable because the catalyst has high activity; calcium carboxylate, vanadium carboxylate, iron carboxylate, titanium carboxylate and zirconium carboxylate are more preferable; and iron carboxylate and titanium carboxylate are most preferable.

Also calcium carboxylate, vanadium carboxylate, titanium carboxylate, potassium carboxylate, barium carboxylate, manganese carboxylate, nickel carboxylate, cobalt carboxylate and zirconium carboxylate are preferable because the resulting curable composition is less colored and the resulting cured article is excellent in heat resistance and weatherability, and calcium carboxylate, titanium carboxylate, potassium carboxylate, barium carboxylate and zirconium carboxylate are more preferable.

The component (B) contain, as the main ingredient, carboxylic acid metal salts represented by the general formulas (2) to (12):

| | |
|---|---|
| $Ca(OCOR)_2$ | (2) |
| $V(OCOR)_3$ | (3) |
| $Fe(OCOR)_2$ | (4) |
| $Fe(OCOR)_3$ | (5) |
| $Ti(OCOR)_4$ | (6) |
| $K(OCOR)$ | (7) |
| $Ba(OCOR)_2$ | (8) |
| $Mn(OCOR)_2$ | (9) |
| $Ni(OCOR)_2$ | (10) |
| $Co(OCOR)_2$ | (11) |
| $Zr(O)(OCOR)_2$ | (12) | wherein R represents a substituted or non-substituted hydrocarbon group and may contain a carbon-carbon double bond.

As the carboxylic acid, a $C_{2-40}$ (including carbonyl carbon) hydrocarbon carboxylic acid group-containing compound can be preferably used, and a $C_{2-20}$ hydrocarbon carboxylic acid group-containing compound can be particularly preferably used in view of availability.

Specific examples thereof include linear saturated fatty acids such as acetic acid, propionic acid, butyric acid, valeric acid, caproic acid, enanthic acid, caprylic acid, 2-ethylhexanoic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanoic acid, melissic acid, and lacceric acid; monoene unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselinic acid, oleic acid, elaidic acid, asclepinic acid, vaccenic acid, gadoleic acid, gondonic acid, cetoleic acid, erucic acid, brassidic acid, selacholeic acid, xymenic acid, and lumequenic acid; polyene unsaturated fatty acids such as linoleic acid, 10,12-octadecadienoic acid, hiragoic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, 4,8,12,15,18,21-tetracosahexaenoic acid, and docosahexaenoic acid; branched fatty acids such as iso acid, ante-iso acid, tuberculostearic acid, pivalic acid, and neodecanoic acid; fatty acids having a triple bond, such as tariric acid, stearoleic acid, crepenynic acid, xymenynic acid, and 7-hexadecynoate; alicyclic carboxylic acids such as naphthenic acid, malvalic acid, sterculic acid, hydnocarpic acid, chaulmoogric acid, and gorlic acid; oxygen-containing fatty acids such as sabinic-acid, 2-hydroxytetradecanoic acid, ipurolic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinoleic acid, kamlolenic acid, licanic acid, 22-hydroxydocosanoic acid, and cerebronic acid; and dicarboxylic acids such as succinic acid, glutaric acid, adipic acid, pimelic acid, sberic acid, azelaic acid, and sebacic acid.

In case the carboxylic acid has high melting point (high crystallinity), its carboxylic acid metal salt having an acid radical also has high melting point and is not easily handled (poor operability). Therefore, the melting point of the carboxylic acid is preferably 65° C. or lower, more preferably from −50 to 50° C., and particularly preferably from −40 to 35° C.

In case the carboxylic acid contains a lot of carbon atoms (large molecular weight), its carboxylic acid metal salt having an acid radical is in the form of solid or liquid with high viscosity and is not easily handled (poor operability). On the other hand, when the carboxylic acid contains less carbon atoms (small molecular weight), its carboxylic acid metal salt having an acid radical contains a large amount of a component which is likely to be vaporized by heating and, therefore, catalytic ability of the carboxylic acid metal salt is lowered sometimes. Under the conditions where the composition is thinly spread (thin layer), the composition is drastically vaporized by heating and catalytic ability of the carboxylic acid metal salt is drastically lowered sometimes. Therefore, the number of carbon atoms including carbons atoms of a carbonyl group of the carboxylic acid is preferably from 2 to 17, more preferably from 3 to 13, and particularly preferably 5 to 10.

In view of availability, cheap price and good compatibility with the component (A), the carboxylic acid is preferably 2-ethylhexanoic acid, octylic acid, neodecanoic acid, oleic acid, or naphthenic acid. The naphthenic acid is represented by the formula (20):

$$C_nH_{2n-2}O_2 \tag{20}$$

The carboxylic acid is more preferably carboxylic acid wherein a carbon atom adjacent to a carbonyl group is tertiary carbon (2-ethylhexanoic acid, etc.) or carboxylic acid wherein a carbon atom adjacent to a carbonyl group is quaternary carbon (neodecanoic acid, pivalic acid, etc.) because of its rapid curing rate, and particularly preferably carboxylic acid wherein a carbon atom adjacent to a carbonyl group is quaternary carbon.

In view of compatibility and availability, specific examples of preferable carboxylic acid metal salt include iron 2-ethylhexanoate (divalent), iron 2-ethylhexanoate (trivalent), titanium 2-ethylhexanoate (tetravalent), vanadium 2-ethylhexanoate (trivalent), calcium 2-ethylhexanoate (divalent), potassium 2-ethylhexanoate (monovalent), barium 2-ethylhexanoate (divalent), manganese 2-ethylhexanoate (divalent), nickel 2-ethylhexanoate (divalent), cobalt 2-ethylhexanoate (divalent), zirconium 2-ethylhexanoate (tetravalent), iron neodecanoate (divalent), iron neodecanoate (trivalent), titanium neodecanoate (tetravalent), vanadium neodecanoate (trivalent), calcium neodecanoate (divalent), potassium neodecanoate (monovalent), barium neodecanoate (divalent), zirconium neodecanoate (tetravalent), iron oleate (divalent), iron oleate (trivalent), titanium oleate (tetravalent), vanadium oleate (trivalent), calcium oleate (divalent), potassium oleate (monovalent), barium oleate (divalent), manganese oleate (divalent), nickel oleate (divalent), cobalt oleate (divalent), zirconium oleate (tetravalent), iron naphthenate (divalent), iron naphthenate (trivalent), titanium naphthenate (tetravalent), vanadium naphthenate (trivalent), calcium naphthenate (divalent), potassium naphthenate (monovalent), barium naphthenate (divalent), manganese naphthenate (divalent), nickel naphthenate (divalent), cobalt naphthenate (divalent), and zirconium naphthenate (tetravalent).

In view of catalytic activity, iron 2-ethylhexanoate (divalent), iron 2-ethylhexanoate (trivalent), titanium 2-ethylhexanoate (tetravalent), iron neodecanoate (divalent), iron neodecanoate (trivalent), titanium neodecanoate (tetravalent), iron oleate (divalent), iron oleate (trivalent), titanium oleate (tetravalent), iron naphthenate (divalent), iron naphthenate (trivalent) and titanium naphthenate (tetravalent) are more preferable, and iron 2-ethylhexanoate (trivalent), iron neodecanoate (trivalent), iron oleate (trivalent) and iron naphthenate (trivalent) are particularly preferable.

In view of coloration, more preferred are titanium 2-ethylhexanoate (tetravalent), calcium 2-ethylhexanoate (divalent), potassium 2-ethylhexanoate (monovalent), barium 2-ethylhexanoate (divalent), zirconium 2-ethylhexanoate (tetravalent), titanium neodecanoate (tetravalent), calcium neodecanoate (divalent), potassium neodecanoate (monovalent), barium neodecanoate (divalent), zirconium neodecanoate (tetravalent), titanium oleate (tetravalent), calcium oleate (divalent), potassium oleate (monovalent), barium oleate (divalent), zirconium oleate (tetravalent), titanium naphthenate (tetravalent), calcium naphthenate (divalent), potassium naphthenate (monovalent), barium naphthenate (divalent) and zirconium naphthenate (tetravalent).

These carboxylic acid metal salts are produced by employing a precipitation method of reacting a carboxylic acid group-containing compound or its ester with sodium hydroxide to form an aqueous solution of a sodium soap and adding a separately prepared aqueous solution of a metal salt, thereby to precipitate a metal soap, a fusion method of reacting a carboxylic acid group-containing compound or its ester with a hydroxide, an oxide or a weak acid salt of metal at high temperature, a direct method of directly reacting a carboxylic acid group-containing compound and a metal powder, and a method of reacting an alcoholate or chloride with a carboxylic acid group-containing compound in an anhydrous organic solvent.

Preferably, such a carboxylic acid metal salt is diluted with a dilution solvent such as mineral spirit, toluene, hexylene glycol, diethylene glycol, refined kerosene or dioctyl phthalate and is used in the form of a solution having a metal content of about 1 to 40% by weight.

The amount of the component (B) is preferably from about 0.005 to 5 parts by weight, and more preferably from about 0.01 to 3 parts by weight, in terms of a metallic element contained in the component (B) based on 100 parts by weight of the component (A). When the amount of the component (B) is less than the above range, the curing rate decreases sometimes and the curing reaction does not proceed sufficiently and, therefore, it is not preferable. On the other hand, when the amount of the component (B) is more than the above range, local heat generation and expansion arise during curing, and thus it becomes impossible to obtain satisfactory cured article and pot life is too shorten. Therefore, it is not preferable in view of operability.

Calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate can be used alone, or two or more kinds of them can be used in combination. Furthermore, these metal salts can be used in combination with carboxylic acid tin salt, carboxylic acid lead salt, carboxylic acid bismuth salt and carboxylic acid cerium salt.

In case proper curability can not be obtained by using only a carboxylic acid metal salt as the component (B) because of low activity, various amine compounds as the component (C) can be added as a promoter. Various amine compounds are described in Japanese Kokai Publication No. Hei-5-287187 and specific examples thereof include, but are not limited to, aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triethylamine, triamylamine, trihexylamine, and trioctylamine; aliphatic unsaturated amines such as triallylamine and oleylamine; aromatic amines such as laurylaniline, stearylaniline, triphenylamine, N,N-dimethylaniline, and dimethylbenzylaniline; and other amines such as monoethanolamine, diethanolamine, triethanolamine, dimethylaminoethanol, diethylenetriamine, triethylenetetramine, tetraethylenepentamine, benzylamine, diethylaminopropylamine, xylylenediamine, ethylenediamine, hexamethylenediamine, dodecamethylenediamine, dimethylethylenediamine, triethylenediamine, guanidine, diphenylguanidine, N,N,N',N'-tetramethyl-1,3-butanediamine, N,N,N',N'-tetramethylethylenediamine, 2,4,6-tris(dimethylaminomethyl)phenol, morpholine, N-methylmorpholine, 2-ethyl-4-methylimidazole, and 1,8-diazabicyclo (5,4,0)undecene-7 (DBU).

In the present invention, an amino group-containing silane coupling agent can also be used as the component (C). The amino group-containing silane coupling agent is a compound having a group containing a silicon atom bonded to a hydrolyzable group (hereinafter referred to as a hydrolyzable silicon group) and an amino group. The hydrolyzable silicon group includes a group represented by the formula (1) wherein X is a hydrolyzable group. Specific examples thereof include the same hydrolyzable silicon groups described above. Among these groups, methoxy group and ethoxy group are preferable in view of the hydrolysis rate. The number of the hydrolyzable groups are preferably 2 or more, and particularly preferably 3 or more.

Specific examples of the amino group-containing silane coupling agent include γ-aminopropyltrimethoxysilane, γ-aminopropyltriethoxysilane, γ-aminopropyltriisopropoxysilane, γ-haminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-ureidopropyltrimethoxysilane, N-phenyl-γ-aminopropyltrimethoxysilane, N-benzyl-γ-aminopropyltrimethoxysilane, and N-vinylbenzyl-γ-aminopropyltriethoxysilane. Also it is possible to use derivatives obtained by modifying them, for example, amino-modified silyl polymer, silylated amino polymer, unsaturated aminosilane complex, phenylamino long-chain alkyl silane and aminosilylated silicone. These amino group-containing silane coulping agents may be used alone, or two or more kinds of them may be used in combination.

Since the co-catalytic ability drastically vary depending on the structure of the component (C) itself and compatibility with the component (A), it is preferable to select a proper compound as the component (C) according to the kind of the component (A) to be used. When using an isobutylene polymer as the component (A), comparatively long-chain aliphatic secondary amines such as dioctylamine and distearylamine, and aliphatic secondary amines such as dicyclohexylamine are preferable in view of excellent co-catalytic ability.

The amount of the amine compound as the component (C) is preferably from about 0.01 to 20 parts by weight, and more preferably from about 0.1 to 5 parts by weight, based on 100 parts by weight of the organic polymer as the component (A). When the amount of the amine compound is less than 0.01 parts by weight, the curing rate decreases sometimes and the curing reaction does not proceed sufficiently and, therefore, it is not preferable. On the other hand, when the amount of the amine compound is more than 20 parts by weight, pot life is too shorten. Therefore, it is not preferable in view of operability.

In the composition of the present invention, a silane coupling agent other than the amino group-containing silane coupling agent can also be used.

Examples of the functional group other than the amino group include mercapto group, epoxy group, carboxyl group, vinyl group, isocyanate group, isocyanurate, and halogen.

Specific examples of the silane coupling agent other than the amino group-containing silane coupling agent include mercapto group-containing silanes such as γ-mercaptopropyltrimethoxysilane, γ-mercaptopropyltriethoxysilane, γ-mercaptopropylmethyldimethoxysilane, and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis (2-methoxyethoxy) silane, and N-β-(carboxymethyl) aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, and γ-acryloyloxypropyltriethoxysilane; halogen-containing silanes such as γ-chloropropyltrimethoxysilane; isocyanurate silanes such as tris(trimethoxysilyl)isocyanurate; and isocyanate group-containing silanes such as γ-isocyanatepropyltrimethoxysilane, γ-isocyanatepropyltriethoxysilane, γ-isocyanatepropylmethyldiethoxysilane, and γ-isocyanatepropylmethyldimethoxysilane. Also it is possible to use derivatives obtained by modifying them, for example, block isocyanatesilane and silylated polyester as the silane coupling agent.

The amount of the silane coupling agent other than the amino group-containing silane coupling agent to be used is preferably from 0.01 to 20 parts by weight, and more preferably from 0.1 to 5 parts by weight, based on 100 parts by weight of the component (A).

As the curable composition of the present invention, various fillers can be used, if necessary. Specific examples of the filler include wood flour, pulp, cotton chip, asbestos, glass fiber, carbon fiber, mica, walnut shell flour, chaff flour, graphite, diatomaceous earth, china clay, fumed silica, precipitated silica, crystalline silica, fused silica, dolomite, silicic anhydride, carbon black, calcium carbonate, clay, talc, titanium oxide, aluminum hydroxide, magnesium carbonate, fine aluminum powders, flint powders, and zinc powders. Among these fillers, precipitated silica, fumed silica, crystalline silica, fused silica, dolomite, carbon black, calcium carbonate, titanium oxide and talc are preferable in view of the reinforcing effect, bulking effect and availability. These fillers may be used alone, or two or more kinds of them may be used in combination. The amount of the filler to be used is preferably from 10 to 1000 parts by weight, and more preferably from 50 to 300 parts by weight, based on 100 parts by weight of the component (A).

In the curable composition of the present invention, it is more effective to use plasticizer in combination with fillers because it is possible to enhance elongation of the cured article and to mix a large amount of the filler. Specific examples of the plasticizer include phthalic acid esters such as dioctyl phthalate, dibutyl phthalate, butylbenzyl phthalate, diisodecyl phthalate, and diisoundecyl phthalate; aliphatic dibasic acid esters such as dioctyl adipate, isodecyl succinate, and dioctyl sebacate; glycol esters such as diethylene glycol dibenzoate and pentaerythritol ester; aliphatic esters such as butyl oleate and methyl acetylricinoleate; phosphoric acid esters such as tricresyl phosphate, trioctyl phosphate, and octyldiphenyl phosphate; epoxy plasticizers such as epoxidated soybean oil, epoxidated linseed oil, and benzyl epoxystearate; polyester plasticizer such as polyesters of dibasic acid and a divalent alcohol; polyethers such as polypropylene glycol and its derivative; polystyrenes such as poly-α-methylstyrene and polystyrene; hydrocarbon oligomers such as polybutadiene, butadiene-acrylonitrile copolymer, polychloroprene, polyisoprene, polybutene, hydrogenated polybutadiene, hydrogenated polyisoprene, and process oil; and chlorinated paraffins.

These plasticizer may be used alone, or two or more kinds of them may be used in combination. When using the plasticizer in the amount within a range from 1 to 200 parts by weight based on 100 parts by weight of the reactive silicon group-containing organic polymer, good results are obtained.

In the curable composition of the present invention, an epoxy resin can be used in combination. In this case, the epoxy resin and the reactive silicon group-containing organic polymer can be modified.

As the epoxy resin, conventionally known epoxy resins can be widely used and examples thereof include bisphenol A type epoxy resin, bisphenol F type epoxy resin, flame retardant epoxy resins such as glycidyl ether of tetrabromobisphenol A; novolak type epoxy resin, hydrogenated bisphenol A type epoxy resin, glycidyl ether type epoxy resin of a bisphenol A propylene epoxide adduct, diglycidyl-p-oxybenzoic acid, diglycidyl phthalate epoxy resins such as diglycidyl phthalate, diglycidyl tetrahydrophthalate, and diglycidyl hexahydrophthalate; m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ether, glycidyl ethers of polyvalent alcohol such as glycerin; hydantoin type epoxy resin, and epoxidated compounds of unsaturated polymer such as petroleum resin.

Among these epoxy resins, those having at least two epoxy groups in the molecule are preferable because the resulting composition exhibits high reactivity upon curing and the cured article easily forms a three-dimensional network. More preferable epoxy resins are bisphenol A type epoxy resin, bisphenol F type epoxy resin, novolak type epoxy resin and diglycidyl phthalate epoxy resin in view of availability and adhesion.

As the curing agent of the epoxy resin, conventionally known curing agents for epoxy resin can be widely used and examples thereof include amines such as triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine, and 2,4,6-tris (dimethylaminomethyl) phenol; latent curing agents such as tertiary amine salts, polyamide resins, ketimines, aldimines, and enamines; imidazoles; dicyandiamides; boron trifluoride complex compounds; carboxylic anhdyrides such as phthalic anhydride, hexahydrophthalic anhdyride, tetrahydrophthalic anhdyride, endomethylenetetrahydrophthalic anhdyride, dodecenylsuccinic anhydride, and pyromellitic anhydride; alcohols, phenols; and carboxylic acids.

The epoxy resin is preferably used in the amount within a range from 1 to 100 parts by weight, and more preferably from 10 to 50 parts by weight, based on 100 parts by weight of the reactive silicon group-containing organic polymer. The curing agent for epoxy resin is preferably used in the amount within a range from 1 to 200 parts by weight, and more preferably from 10 to 100 parts by weight, based on 100 parts by weight of the epoxy resin.

The method of preparing the curable composition of the present invention is not specifically limited and, for example, there can be used a method of mixing the above-described components, kneading the mixture at normal temperature or elevated temperature using a mixer, roll, kneader or the like, or a method of dissolving the components in a small amount of a proper solvent and mixing. By appropriately using these components in combination, one-part, two-part and many-part compositions can be prepared and used.

When the curable composition of the present invention is exposed to atmospheric air, it forms a three-dimensional network by the action of moisture in the atmospheric air and thus cured into a solid having rubber elasticity.

To the curable composition of the present invention, various additives can be added, if necessary. Examples of the additive include other curing catalysts (for example, tetravalent tin, divalent tin, etc.), physical properties modifiers for modifying tensile properties of the resulting cured article, adhesion imparting agents such as silane coupling agents, antioxidants, radical inhibitors, ultraviolet absorbers, metal deactivators, antiozonants, photostabilizres, phosphorus peroxide decomposing agents, lubricants, pigments, blowing agents, photocurable resins, and thixotropy imparting agents.

Specific examples of these additives are described in the following publications such as Japanese Kokoku Publication No. Hei-4-69659, Japanese Kokoku Publication No. Hei-7-108928, Japanese Kokai Publication No. Sho-63-254149, and Japanese Kokai Publication No. Sho-64-22904.

The composition of the present invention has excellent weatherability, heat resistance, water resistance and electrical insulating properties, which originate in the main chain skeleton, and also has the effect of improving physical properties such as strength and elongation. Therefore, the composition of the present invention can be preferably used as elastic sealing materials for buildings, sealing materials for double glazing, materials for electrical and electronic parts such as solar battery rear face sealing materials, electrical insulating materials such as insulating coating materials for electric wires and cables, binders, adhesives, paints, injections, coating materials, and rustproofing and waterproofing sealants. The composition of the present invention is particularly useful when used as adhesives, elastic sealing materials for buildings and sealing materials for siding.

BEST MODE FOR CARRYING OUT THE INVENTION

The following examples and comparative examples are further illustrative of the present invention, but are by no means limitative of the scope of the present invention.

EXAMPLES 1 TO 4 AND COMPARATIVE EXAMPLE 1

5 Parts by weight of an epoxy resin (manufactured by Yuka-Shell Epoxy Co. Ltd.) under the trade name of Epikote 828), 60 parts by weight of a hydrogenated α-olefin oligomer (manufactured by Idemitsu Petrochemical Co., Ltd. under the trade name of PAO5004), 50 parts by weight of precipitated calcium carbonate (manufactured by MARUO CALCIUM CO., LTD. under the trade name of Sealets 200), 50 parts by weight of precipitated calcium carbonate (manufactured by MARUO CALCIUM CO., LTD. under the trade name of MC-5), 40 parts by weight of ground calcium carbonate (manufactured by SHIRAISHI CALCIUM Co., LTD. under the trade name of Softon 3200), 3 parts by weight of a photocurable resin (manufactured by TOAGOSEI Co., Ltd. under the trade name of Aronix M-309), 1 part by weight of a benzotriazole ultraviolet absorber (manufactured by Ciba-Geigy Japan Corporation) under the trade name of Tinuvin 327), 1 part by weight of a hindered amine photostabilizer (manufactured by Sankyo Co., Ltd. under the trade name of Sanol LS-770), 1 parts by weight of a hindered phenol antioxidant (manufactured by Ciba-Geigy Japan Corporation) under the trade name of Irganox 1010) and 5 parts by weight of water were added to 150 parts by weight of an isobutylene polymer having a reactive silicon group (manufactured by Kaneka Corporation under the trade name of EP505S, isobutylene polymer/paraffin process oil=100/50) as the component (A) and the mixture was sufficiently kneaded using three paint rolls to obtain a main ingredient.

Calcium octylate (2-ethylhexanoate) (manufactured by NIHON KAGAKU SANGYO CO., LTD. under the trade name of Nikkaoctix Ca, 5% toluene solution) as the component (B) and distearylamine (manufactured by Kao Corporation, FARMIN D86), each weighed in the amount shown in Table 1, were sufficiently mixed with stirring using a spatula to obtain a curing agent of Example 1.

Vanadium naphthenate (manufactured by NIHON KAGAKU SANGYO CO., LTD. under the trade name of Nikkaoctix V, 2% toluene solution) as the component (B) of the present invention and distearylamine (manufactured by Kao Corporation, FARMIN D86) as the component (C), each weighed in the amount shown in Table 1, were sufficiently mixed with stirring to obtain a curing agent of Example 2. Iron octylate (2-ethylhexanoate) (manufactured by NIHON KAGAKU SANGYO CO., LTD. under the trade name of Nikkaoctix Fe, 6% toluene solution) as the component (B) and laurylamine (manufactured by Wako Pure Chemical Industries, Ltd.) as the component (C), each weighed in the amount shown in Table 1, were sufficiently mixed with stirring to obtain a curing agent of Example 3. Titanium octylate (2-ethylhexanoate) (3% toluene solution) as the component (B) and laurylamine (manufactured by Wako Pure Chemical Industries, Ltd.) as the component (C), each weighed in the amount shown in Table 1, were sufficiently mixed with stirring to obtain a curing agent of Example 4. Tin octylate (2-ethylhexanoate) (manufactured by Nitto Kasei Co., Ltd. under the trade name of Neostann U-28) as the component (B) and laurylamine as the component (C), each weighed in the amount shown in Table 1, were sufficiently mixed with stirring to obtain a curing agent of Comparative Example 1.

These main ingredients and curing agents were mixed in the ratio shown in Table 1 and each of the mixtures was filled in a H shaped specimen using an aluminum substrate according to the method for a tensile adhesion test sample defined in JIS A5758-1992. The curing conditions were (23° C.×7 days+50° C.×7 days). As the aluminum substrate, an anodized aluminum substrate measuring 50×50×5 mm in accordance with JIS H4000 was used. Before filling the mixture, the anodized aluminum substrate was washed with methyl ethyl ketone (manufactured by Wako Pure Chemical Industries, Ltd.), coated with a primer (manufactured by Dow Corning Toray Silicone Co., Ltd. under the trade name of D-2) and then dried at normal temperature for 30 minutes.

The H shaped sample obtained by the method described above was tested in a control room at a temperature of 23° C. and a humidity of 50±5% under the conditions of a testing speed of 50 mm/min in accordance with a tensile adhesion test defined in JIS A5758-1992.

A recovery ratio was measured in the following manner. First, the cured H shaped sample was dipped in warm water at 50° C. for one day, taken out from warm water and then allowed to stand at room temperature for one day. The sample was compressed by 70% in compressibility so that the thickness decreases to 8.4 mm from 12 mm, fixed, heated in a hot-air dryer at 100° C. for one day, released from compression and then allowed to stand at room temperature for one day. The thickness of the sample was measured and a recovery ratio was calculated.

The same mixture was filled in an ointment can and the time required to form a skin (skinning time) on the surface under the conditions of a temperature of 23° C. and a relative humidity of 50% was measured for evaluation of curability. The shorter the skinning time is, the more excellent the curability is.

The results are shown in Table 1. CF in the table means that the filled cured article causes cohesive failure that is a fracture state required to a sealing material.

by weight of precipitated calcium carbonate (manufactured by SHIRAISHI KOGYO Co., Ltd. under the trade name of HAKUENKA CCR) dried previously under reduced pressure with stirring at 120° C. for 2 hours using a 5 L planetary mixer and 20 parts by weight of titanium oxide (manufactured by ISHIHARA SANGYO KAISHA, LTD. under the

TABLE 1

|  |  |  |  | Example 1 | Example 2 | Example 3 | Example 4 | Comparative Example 1 |
|---|---|---|---|---|---|---|---|---|
| Main ingredient | Component (A) | EP505S | phr |  |  | 150 |  |  |
|  |  | PAO5004 | phr |  |  | 60 |  |  |
|  |  | Sealets 200 | phr |  |  | 50 |  |  |
|  |  | Softon 3200 | phr |  |  | 40 |  |  |
|  |  | MC-5 | phr |  |  | 50 |  |  |
|  |  | Epikote 828 | phr |  |  | 5 |  |  |
|  |  | Aronix M-309 | phr |  |  | 3 |  |  |
|  |  | Irganox 1010 | phr |  |  | 1 |  |  |
|  |  | Tinuvin 327 | phr |  |  | 1 |  |  |
|  |  | Sanol LS-770 | phr |  |  | 1 |  |  |
|  |  | Water | phr |  |  | 5 |  |  |
| Curing agent | Component (B) | Ca octylate | phr | 5.7 |  |  |  |  |
|  |  | V naphthenate | phr |  | 9.0 |  |  |  |
|  |  | Fe octylate | phr |  |  | 5.0 |  |  |
|  |  | Ti octylate | phr |  |  |  | 4.5 |  |
|  |  | Sn octylate | phr |  |  |  |  | 3.0 |
|  | Component (C) | Disteaylamine | phr | 0.74 | 0.74 |  |  |  |
|  |  | Laurylamine | phr |  |  | 1.00 | 0.26 | 0.66 |
| Properties | Curability | Skinning time | Hours | 4 | 4 | >9 | 3 | 4 |
|  | H shaped | M50 | MPa | 0.05 | 0.07 | 0.08 | 0.08 | 0.1 |
|  | tensile | strength at break | MPa | 0.45 | 0.64 | 0.27 | 0.34 | 0.26 |
|  | properties | Elongation at break | % | 770 | 760 | 440 | 580 | 340 |
|  |  | Fracture state |  | CF | CF | CF | CF | CF |
|  |  | Recovery ratio | % | 57 | 73 | 27 | 29 | 54 |

As shown in Table 1, when using an isobutylene polymer as the component (A), using calcium octylate, vanadium naphthenate and titanium octylate as the component (B) and using distearylamine and laurylamine in combination as the promoter (Examples 1, 2 and 4), the same skinning time as that in case of using tin octylate and laurylamine of Comparative Example 1 in combination could be ensured. When using iron octylate as the component (B) and using laurylamine as the promoter (Example 3), the skinning time was 9 or more and it was confirmed that the mixture was sufficiently cured after one day. In both cases where these carboxylic acid metal salts are used (Examples 1 to 4), the resulting cured articles exhibited high strength at break and elongation at break as compared with Comparative Example 1 using tin octylate and laurylamine. When using titanium octylate and iron octylate, the recovery property was inferior than that in case of Comparative Example 1. When using vanadium naphthenate (Example 2), it exhibited excellent recovery properties.

EXAMPLE 5 AND COMPARATIVE EXAMPLE 2

55 Parts by weight of a plasticizer (trade name: PPG-3000), 2 parts by weight of an anti-sag agent (manufactured by Kusumoto Chemicals, Ltd. under the trade name of Disparlon #6500), 1 part by weight of a benzotriazole ultraviolet absorber (manufactured by Ciba-Geigy Japan Corporation under the trade name of Tinuvin 327) and 1 part by weight of a hindered amine photostabilizer (manufactured by Sankyo Co., Ltd. under the trade name of Sanol LS-770) were added to 95 parts by weight of a polyether polymer having a reactive silicon group MS polymer S203 (manufactured by Kaneka Corporation) as the component (A), followed by mixing by hands. To the mixture, 120 parts by weight of precipitated calcium carbonate (manufactured trade name of Tipaque R-820) were added, followed by mixing for 10 minutes. The mixture was taken out from the planetary mixer, kneaded once using a paint roller with three rolls, dehydrated again under reduced pressure with stirring at 120° C. for 2 hours using a 5 L planetary mixer, and then it was confirmed that the moisture content is reduced to about 700 ppm. The mixture was cooled and 2 parts by weight of a dehydrating agent (manufactured by Nippon Unicar Co., Ltd. under the trade name of A-171) was added, followed by mixing with stirring for 15 minutes. 3 Parts by weight of an aminosilane coupling agent (manufactured by Nippon Unicar Co., Ltd. under the trade name of A-1120) was added, followed by mixing with stirring for 15 minutes. A mixture prepared previously by mixing zirconium octylate (manufactured by NIHON KAGAKU SANGYO CO., LTD. under the trade name of Nikkaoctix Zr, 12% toluene solution) as the component (B) and laurylamine (manufactured by Wako Pure Chemical Industries, Ltd.) as the component (C), each weighed in the amount shown in Table 2, was added, followed by mixing with stirring under reduced pressure for 5 minutes. The resulting mixture was filled in a paper cartridge coated with aluminum for one-part type (manufactured by SHOWA MARUTSUTSU COMPANY, LTD.) without entrapping bubbles to obtain a one-part curable composition. In the same manner as described above, except that 2 parts by weight of dibutyltin diacetylacetonate (manufactured by Nitto Kasei Co., Ltd. under the trade name of U-220) was used in place of the mixture of zirconium octylate and laurylamine, a curable composition of Comparative Example 2 was obtained.

The above one-part curable composition was allowed to stand at room temperature for 24 or more hours, a test sample used in the tensile test was made in the following manner. The one-part curable composition was filled in a H shaped specimen using an aluminum substrate according to the method for a tensile adhesion test sample defined in JIS A5758-1992 using a commercially available gun. The curing conditions were (23° C.×14 days+50° C.×14 days) As the aluminum substrate, an anodized aluminum substrate measuring 50×50×5 mm in accordance with JIS H4000 was used. Before filling the mixture, the anodized aluminum substrate was washed with methyl ethyl ketone (manufactured by Wako Pure Chemical Industries, Ltd.). The H shaped sample obtained by the method described above was tested in a control room at a temperature of 23° C. and a humidity of 50±5% under the conditions of a testing speed of 50 mm/min in accordance-with a tensile adhesion test defined in JIS A5758-1992. The strength obtained at tension of 50%, 100% or 150% of the cured article was abbreviated as M50, M100 or M150. The strength at break was abbreviated as TB and the elongation at break was abbreviated as EB.

Since the adhesion property is important characteristic of the one-part curable composition, the adhesion property was measured by using an anodized aluminum substrate and a poly(vinyl chloride) coated steel substrate. On each of substrates whose surface was washed with methyl ethyl ketone, a one-part curable composition was installed through a one-part cartridge in a conical shape of about 1 cm in width×about 3 cm in length using a commercially available gun, and then cured under the conditions (23° C.×14 days+50° C.×14 days). After curing, a hand peel test was carried out while cutting the bonded surface using a cutter knife and the surface of the substrate was visually observed. CF in Table 2 means that the filled cured article causes cohesive failure that is a fracture state required to a sealing material.

Curability in depth was evaluated in the following manner. That is, a polyethylene tube of 16.5 mm in inner diameter×80 mm in length was filled with the one-part curable composition prepared in Example 5. Upon each measuring day, the outermost cured portion at the tip of the tube was taken out and the thickness was measured by a caliper.

To evaluate practicability of the one-part curable composition, the composition was stored in a hot-air dryer controlled at 50° C. in the state of being filled in a one-part cartridge for 2 weeks and deep curability after storage was evaluated.

The results are shown in Table 2.

TABLE 2

| Formulation table | Components | Trade name | Example 5 | Comparative Example 2 | |
|---|---|---|---|---|---|
| | Component (A) | S203 | 95 | 95 | Parts by weight |
| | Plasticizer | PPG3000 | 55 | 95 | Parts by weight |
| | Calcium carbonate | HAKUENKA CCR | 120 | 120 | Parts by weight |
| | Photostabilizer | Sanol LS-770 | 1 | 1 | Parts by weight |
| | Ultraviolet absorber | Tinuvin 327 | 1 | 1 | Parts by weight |
| | Anti-sag agent | Disparlon #6500 | 2 | 2 | Parts by weight |
| | Titanium oxide | Tipaque R-820 | 20 | 20 | Parts by weight |
| | Dehydrating agent | A-171 | 2 | 2 | Parts by weight |
| | Adhesion imparting agents | A-1120 | 3 | 3 | Parts by weight |
| | Component (B) | Zirconium octylate | 8.1 | | Parts by weight |
| | | U-220 | | 2 | Parts by weight |
| | Component (C) | Laurylamine | 1.4 | | Parts by weight |
| H shaped tensile mechanical properties | | M50 | 0.27 | 0.19 | Mpa |
| | | M100 | 0.38 | 0.31 | MPa |
| | | M150 | 0.46 | 0.40 | Mpa |
| | | TB (Strength at break) | 0.84 | 0.93 | MPa |
| | | EB (Elongation at break) | 520 | 570 | % |
| Adhesion property | | Anodized aluminum | CF | CF | Fracture state |
| | | Poly (vinyl chloride)-coated steel plate | CF | CF | Fracture state |
| Curability | | Curability in depth at 23° C. for 1 week | 7.7 | 10.6 | mm |
| | | Curability in depth at 23° C. for 2 weeks | 12.2 | 15.6 | mm |
| Storage stability (stored at 50° C. for 2 weeks) | | Curability in depth at 23° C. for 1 week | 7.2 | 10.8 | mm |
| | | Curability in depth at 23° C. for 2 weeks | 12.0 | 16.4 | mm |

In Example 5, by using a polyether polymer as the component (A) of the present invention, a zirconium carboxylate salt serving as a silanol condensation catalyst as the component (B) and laurylamine serving as a promoter as the component (C), the resulting one-part curable composition exhibited slightly poor curability but exhibited almost the same elongation and adhesion property, as compared with Comparative Example 2 using dibutyltin diacetylacetonate as a tetravalent tin catalyst, and is suited for practical use (Table 2).

SYNTHESIS EXAMPLE 1

Using polyoxypropylenetriol having a molecular weight of about 3,000 as an initiator, propylene oxide was polymerized in the presence of a zinc hexacyanocobaltate glyme complex catalyst to obtain polypropylene oxide having a number average molecular weight of about 26,000 (molecular weight relative to polystyrene standards as measured by using HLC-8120GPC manufactured by TOSOH CORPORATION as a liquid delivery system, using TSK-GEL H type column manufactured by TOSOH CORPORATION as a column, and using THF as a solvent). Subsequently, a methanol solution of NaOMe was added in the amount of 1.2 equivalent weight per equivalent weight of a hydroxyl group of the hydroxyl group-terminated polypropylene oxide and methanol was distilled off and, furthermore, allyl chloride was added, thereby to convert the terminal hydroxyl group into an allyl group, and thus obtaining an allyl group-terminated trifunctional polypropylene oxide having a number average molecular weight of about 26,000.

In a 1L autoclave, 500 g of the resulting allyl-terminated trifunctional polypropylene oxide 10 g of hexane were added and azeotropic dehydration was conducted at 90° C. After hexane was distilled off under reduced pressure, the atmosphere in the autoclave was replaced by nitrogen. After adding 30 μl of a platinum divinyldisiloxane complex (3 wt % xylene solution in terms of platinum), 7.0 g of dimethoxymethylsilane was added dropwise. The mixed solution was reacted at 90° C. for 2 hours and then the unreacted dimethoxymethylsilane was distilled off under reduced pressure to obtain a reactive silicon group-containing polyoxyalkylene polymer (A-1). The resulting polymer (A-1) had a number average molecular weight of about 26,000. A silyl group introduction ratio was measured by $^1$H-NMR (measured in a $CDCl_3$ solvent using JNM-LA400 manufactured by JEOL) in the following manner. From a relative value (1) of a peak integrated value an allyl terminated proton ($CH_2$=CH—$CH_2$—: approximately 5.1 ppm) relative to a peak integrated value of a $CH_3$ group (approximately 1.2 ppm) of a polypropylene oxide main chain in the above allyl-terminated trifunctional polypropylene oxide before the hydrosilylation reaction, and a relative value (2) of a peak integrated value of a proton ($CH_3(CH_3O)_2Si$—$CH_2$—$CH_2$—: approximately 0.6 ppm) of a methylene group bonded to silicon atoms of the terminated silyl group relative to a peak integrated value of a $CH_3$ group (approximately 1.2 ppm) of a polypropylene oxide main chain in the silyl terminated polypropylene oxide (A-1) after the hydrosilylation reaction, a silyl group introduction ratio ((2)/(1)) was 78%.

SYNTHESIS EXAMPLE 2

After a 2L pressure-resistant glass vessel was equipped with a three-way cock and the atmosphere in the vessel was replaced by nitrogen, 262.5 ml of ethylcyclohexane (dried by standing together with molecular sieves 3A overnight or more), 787.5 ml of toluene (dried by standing together with molecular sieves 3A overnight or more) and 4.85 g (21.0 mmol) of p-DCC (compound (A) described below) were added in the vessel using a syringe.

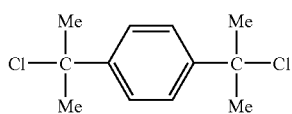

(A)

A pressure glass liquefied gas collecting tube equipped with a needle valve, which contains 438 ml (5.15 mol) of an isobutylene monomer, was connected to a three-way cock and a polymerization vessel was cooled in a dry ice/ethanol bath at −70° C., and then the vessel was evacuated by a vacuum pump. After opening the needle valve, the isobutylene monomer was introduced into the polymerization vessel through the liquefied gas collecting tube and nitrogen was introduced through one end of the three-way cock, thereby returning the pressure in the vessel to normal pressure. Then, 0.72 g (7.7 mmol) of 2-methylpyridine was added. 10.58 ml (96.5 mmol) of titanium tetrachloride was added, thereby to initiate the polymerization. 70 minutes after the initiation of the polymerization, 7.20 g (63.0 mmol) of allyltrimethylsilane was added and the reaction of introduction of an allyl group in the molecular chain ends was conducted. 120 minutes after the addition of allyltrimethylsilane, the reaction solution was washed four times with 200 ml of water and the solvent was distilled off to obtain an allyl terminated isobutylene polymer.

200 g of the resulting allyl terminated isobutylene polymer was mixed with 100 g of a paraffin-based process oil (manufactured by Idemitsu Kosan Co. Ltd. under the trade name of Diana Process PS-32) as a hydrocarbon plasticizer and, after heating to about 75° C., methyldimethoxysilane was added in the amount of 2.4 equivalent weight relative to the terminal allyl group and a platinum (vinylsiloxane) complex was added in the amount of $7.5 \times 10^{-5}$ equivalent weights relative to the terminal allyl group, thereby to conducted the hydrosilylation reaction. The reaction was monitored by FT-IR (IR-408, manufactured by Shimadzu Corporation). As a result, an absorption attributed to olefin at 1640 $cm^{-1}$ disappeared within about 20 hours.

As a result, the objective mixture (A-2) of an isobutylene polymer having a reactive silicon group in both ends of the molecular chains and a plasticizer PS-32 in a weight ratio 2/1 was obtained.

As a result of the measurement using a GPC method (using LC Module 1 manufactured by Waters Co. as a liquid delivery system, using Shodex K-804 as a column and using $CHCl_3$ as a solvent), the resulting polymer had a number average molecular weight of 17,600 and Mw/Mn (a ratio of a weight average molecular weight to a number average molecular weight) of 1.23. By $^1$H-NMR (as measured in $CDCl_3$ using Varian Gemini 300), intensities of resonance signals of protons attributed to each structure (proton originating in an initiator: 6.5 to 7.5 ppm, methyl proton bonded to silicon atoms originating in polymer ends: 0.0 to 0.1 ppm, and methoxy proton: 3.4 to 3.5 ppm) was measured and compared. As a result, the number of terminated silyl functional groups Fn (the number of silyl groups per molecule of the isobutylene) was 1.76.

EXAMPLES 6 TO 15 AND COMPARATIVE EXAMPLE 3

Using the reactive silicon group-containing polyoxyalkylene polymer (A-1) obtained in Synthesis Example 1 as the component (A), the respective additives weighed in accordance with the formulation shown in Table 2 were added and the mixture was sufficiently kneaded using a paint roller with three rolls to obtain a main ingredient.

The main ingredients, various carboxylic acid metal salts shown in Table 1 as the component (B) and laurylamine as the component (C) were mixed with stirring using a spatula for 3 minutes. Various carboxylic acid metal salts as the component (B) were added so that the mole number of metal atoms contained may be the same. After mixing, each of the mixtures was filled in a mold of about 3 mm in thickness using a spatula and then cured under the conditions (23° C.×3 days+50° C.×4 days). The resulting cured article was punched out to form No. 3 dumbbell specimens defined in JIS K6301 and a tensile test was carried out at a testing speed of 200 mm/min using AUTOGRAPH. Modulus at 50% elongation (M50), strength at dumbbell break (Tb), and elongation at dumbbell break (Eb) were measured.

Formulations of the main ingredient and the curing catalyst as well as the results of evaluation of physical properties of the cured articles obtained therefrom are shown in Table 3.

TABLE 3

| Composition (parts by weight) | | 6 | 7 | 8 | 9 | 10 | 11 | 12 | 13 | 14 | 15 | Comparative Example 3 |
|---|---|---|---|---|---|---|---|---|---|---|---|---|
| Component (A) | A-1 | 95 | 95 | 95 | 95 | 95 | 95 | 95 | 95 | 95 | 95 | 95 |
| Filler | HAKUENKA CCR[1] SHIRAISHI KOGYO | 60 | 60 | 60 | 60 | 60 | 60 | 60 | 60 | 60 | 60 | 60 |
| | Viscolite R[1] SHIRAISHI KOGYO | 60 | 60 | 60 | 60 | 60 | 60 | 60 | 60 | 60 | 60 | 60 |
| | Whiton SB[2] SHIRAISHI CALCIUM Co., LTD. | 20 | 20 | 20 | 20 | 20 | 20 | 20 | 20 | 20 | 20 | 20 |
| Plasticizer | Actocol P-23[3] TAKEDA CHEMICAL INDUSTRIES, LTD. | 60 | 60 | 60 | 60 | 60 | 60 | 60 | 60 | 60 | 60 | 60 |
| Thixotropy imparting agent | Disparlon #305[4] Kusumoto Chemicals, Ltd. | 3 | 3 | 3 | 3 | 3 | 3 | 3 | 3 | 3 | 3 | 3 |
| Surface modifier | Aronix M-309[5] Toa Gosei Chemical Industries Co., Ltd. | 3 | 3 | 3 | 3 | 3 | 3 | 3 | 3 | 3 | 3 | |
| Ultraviolet absorber | Tinuvin 327[6] Ciba-Geigy Corporation | 1 | 1 | 1 | 1 | 1 | 1 | 1 | 1 | 1 | 1 | |
| Antioxidant | Irganox 1010[7] Ciba-Geigy Corporation | 1 | 1 | 1 | 1 | 1 | 1 | 1 | 1 | 1 | 1 | |
| Component (B) | Nikkaoctix 6% iron (T)[8] NIHON KAGAKU SANGYO CO., LTD. | 6.6 | | | | | | | | | | |
| | Nikkaoctix 5% iron (T)[9] NIHON KAGAKU SANGYO CO., LTD. | | 7.9 | | | | | | | | | |
| | Titanium 2-ethylhexanoate[10] NIHON KAGAKU SANGYO CO., LTD. | | | 11 | | | | | | | | |
| | Naftex 2% vanadium (P)[11] NIHON KAGAKU SANGYO CO., LTD. | | | | 18 | | | | | | | |
| | Nikkaoctix 5% calcium (T)[12] NIHON KAGAKU SANGYO CO., LTD. | | | | | 5.6 | | | | | | |
| | Pucat 15G[13] NIHON KAGAKU SANGYO CO., LTD. | | | | | | 1.9 | | | | | |
| | Nikkaoctix 8% barium (P)[14] NIHON KAGAKU SANGYO CO., LTD. | | | | | | | 12 | | | | |
| | Nikkaoctix 8% manganese (T)[15] NIHON KAGAKU SANGYO CO., LTD. | | | | | | | | 4.9 | | | |
| | Nikkaoctix 6% nickel (P)[16] NIHON KAGAKU SANGYO CO., LTD. | | | | | | | | | 6.8 | | |
| | Nikkaoctix 12% zirconium (T)[17] NIHON KAGAKU SANGYO CO., LTD. | | | | | | | | | | 5.4 | |
| | Tin 2-ethylhexanoate[18] | | | | | | | | | | | 3 |
| Component (C) | Laurylamine | 0.66 | 0.66 | 0.66 | 0.66 | 0.66 | 0.66 | 0.66 | 0.66 | 0.66 | 0.66 | 0.66 |
| Physical properties of cured article | M50 (MPa) | 0.19 | 0.18 | 0.21 | 0.18 | 0.13 | 0.12 | 0.12 | 0.16 | 0.10 | 0.20 | 0.24 |
| | Tb (MPa) | 0.83 | 0.75 | 1.08 | 1.32 | 0.94 | 0.87 | 0.92 | 0.99 | 1.20 | 1.27 | 0.73 |
| | Eb (%) | 650 | 640 | 750 | 920 | 860 | 760 | 810 | 770 | 1100 | 890 | 540 |

[1] Precipitated calcium carbonate
[2] Ground calcium carbonate
[3] PPG having a molecular weight of about 3000
[4] Hydrogenated castor oil
[5] Trimethylpropane triacrylate
[6] 2-(3,5-di-t-butyl-2-hydroxyphenyl)-5-chlorobenzotriazole
[7] Pentaerythrityl-tetrakis[3-(3,5-di-t-butyl-4-hydroxyphenyl)propionate]
[8] Mineral spirit solution of iron 2-ethylhexanoate, metal (Fe) content: 6%
[9] Mineral spirit solution of iron naphthenate, metal (Fe) content: 5%
[10] Toluene solution of titanium 2-ethylhexanoate, metal (Ti) content: 3%
[11] Toluene solution of vanadium naphthenate, metal (V) content: 2%
[12] Mineral spirit solution of calcium 2-ethylhexanoate, metal (Ca) content: 5%
[13] Diethylene glycol solution of potassium 2-ethylhexanoate, metal (K) content: 15%
[14] Toluene solution of barium 2-ethylhexanoate, metal (Ba) content: 8%
[15] Mineral spirit solution of manganese 2-ethylhexanoate, metal (Mn) content: 8%
[16] Toluene solution of nickel 2-ethylhexanoate, metal (Ni) content: 6%
[17] Mineral spirit solution of zirconium 2-ethylhexanoate, metal (Zr) content: 12%
[18] Metal (Sn) content: 28%

As shown in Table 3, in case of Examples 6 to 15 using various carboxylic acid metal salts, Tb (strength at break) and Eb (elongation at break) of physical properties of the cured article were larger than that in case of Comparative Example 3 using tin 2-ethylhexanoate as a silanol condensation catalyst. Therefore, the cured article exhibited high elongation and high strength.

EXAMPLES 16 TO 28 AND COMPARATIVE EXAMPLE 4

Using the mixture (A-2) of the isobutylene polymer having a reactive silicon group and a plasticizer obtained in Synthesis Example 2 as the component (A), the respective additives weighed in accordance with the formulation shown in Table 4 were added and the mixture was sufficiently kneaded using a paint roller with three rolls to obtain a main ingredient.

In Examples 16 to 28 and Comparative Example 4, the main ingredients, various carboxylic acid metal salts shown in Table 4 as the component (B) and laurylamine as the component (C) were mixed with stirring using a spatula for 3 minutes. After mixing, the mixture was cured at 23° C. and the curing state of the surface was evaluated after 5 days. Various carboxylic acid metal salts as the component (B) were added so that the mole number of metal atoms contained may be the same.

Formulations of the main ingredient and the curing catalyst as well as the results of evaluation of the curing state after 5 days of the cured articles obtained therefrom are shown in Table 4. The symbol in the table "○" means that the surface was cured after 5 days, while the symbol "×" means that the surface was uncured after 5 days.

TABLE 4

| Composition (parts by weight) | | | Examples | | | | | | | | | | | | | Comparative Example |
|---|---|---|---|---|---|---|---|---|---|---|---|---|---|---|---|---|
| | | | 16 | 17 | 18 | 19 | 20 | 21 | 22 | 23 | 24 | 25 | 26 | 27 | 28 | 4 |
| Component (A) | | A-2 | 150 | 150 | 150 | 150 | 150 | 150 | 150 | 150 | 150 | 150 | 150 | 150 | 150 | 150 |
| Filler | Sealets 200[1] | MARUO CALCIUM CO., LTD. | 50 | 50 | 50 | 50 | 50 | 50 | 50 | 50 | 50 | 50 | 50 | 50 | 50 | 50 |
| | MC-5[1] | MARUO CALCIUM CO., LTD. | 50 | 50 | 50 | 50 | 50 | 50 | 50 | 50 | 50 | 50 | 50 | 50 | 50 | 50 |
| | Softon 3200[2] | SHIRAISHI CALCIUM Co., LTD. | 40 | 40 | 40 | 40 | 40 | 40 | 40 | 40 | 40 | 40 | 40 | 40 | 40 | 40 |
| Plasticizer | PA5004[3] | Idemitsu Kosan Co. Ltd. | 60 | 60 | 60 | 60 | 60 | 60 | 60 | 60 | 60 | 60 | 60 | 60 | 60 | 60 |
| Epoxy resin | Epikote 828[4] | Yuka-Shell Epoxy Co. Ltd. | 5 | 5 | 5 | 5 | 5 | 5 | 5 | 5 | 5 | 5 | 5 | 5 | 5 | 5 |
| Surface modifier | Aronix M-309[5] | Toa Gosei Chemical Industries Co., Ltd. | 3 | 3 | 3 | 3 | 3 | 3 | 3 | 3 | 3 | 3 | 3 | 3 | 3 | 3 |
| Ultraviolet absorber | Tinuvin 327[6] | Ciba-Geigy Corporation | 1 | 1 | 1 | 1 | 1 | 1 | 1 | 1 | 1 | 1 | 1 | 1 | 1 | 1 |
| Antioxidant | Irganox 1010[7] | Ciba-Geigy Corporation | 1 | 1 | 1 | 1 | 1 | 1 | 1 | 1 | 1 | 1 | 1 | 1 | 1 | 1 |
| Photostabilizer | Sanol LS-770[8] | Sankyo Co., Ltd. | 1 | 1 | 1 | 1 | 1 | 1 | 1 | 1 | 1 | 1 | 1 | 1 | 1 | 1 |
| Water | | | 5 | 5 | 5 | 5 | 5 | 5 | 5 | 5 | 5 | 5 | 5 | 5 | 5 | 5 |
| Component (B) | Nikkaoctix 6% iron (T)[9] | NIHON KAGAKU SANGYO CO., LTD. | 6.6 | | | | | | | | | | | | | |
| | Nikkaoctix 5% iron (T)[10] | NIHON KAGAKU SANGYO CO., LTD. | | 7.9 | | | | | | | | | | | | |
| | Titanium 2-ethylhexanoate[11] | | | | 11 | | | | | | | | | | 11 | |
| | Naftex 2% vanadium (P)[12] | NIHON KAGAKU SANGYO CO., LTD. | | | | 18 | | | | | | | | | | |
| | Nikkaoctix 5% calcium (T)[13] | NIHON KAGAKU SANGYO CO., LTD. | | | | | 5.6 | | | | | | | | | |
| | Nikkaoctix 8% barium (P)[14] | NIHON KAGAKU SANGYO CO., LTD. | | | | | | 12 | | | | | | | | |
| | manganese T[15] | NIHON KAGAKU SANGYO CO., LTD. | | | | | | | 4.9 | | | | | | | |
| | Nikkaoctix 6% nickel (P)[16] | NIHON KAGAKU SANGYO CO., LTD. | | | | | | | | 6.8 | | | | | | |
| | | | | | | | | | | | | | 6.6 | | | |
| | | | | | | | | | | | | | | | | 18 | |

TABLE 4-continued

| Composition (parts by weight) | | 16 | 17 | 18 | 19 | 20 | 21 | 22 | 23 | 24 | 25 | 26 | 27 | 28 | Comparative Example 4 |
|---|---|---|---|---|---|---|---|---|---|---|---|---|---|---|---|
| | Nikkaoctix 12% cobalt (T)[17] | | | | | | | | | 3.4 | | | | | |
| | Nikkaoctix 12% zirconium (T)[18] | | | | | | | | | | 5.4 | | | | |
| | Nikkaoctix 18% zinc (T)[19] | | | | | | | | | | | | | | 2.6 |
| Component (C) | Laurylamine | 0.66 | 0.66 | 0.66 | 0.66 | 0.66 | 0.66 | 0.66 | 0.66 | 0.66 | 0.66 | | | | 0.66 |
| | Curing state after 5 days | ○ | ○ | ○ | ○ | ○ | ○ | ○ | ○ | ○ | ○ | ○ | ○ | ○ | X |

[1] Precipitated calcium carbonate
[2] Ground calcium carbonate
[3] Poly α-olefin
[4] Bisphenol A type epoxy resin
[5] Trimethylpropane triacrylate
[6] 2-(3,5-di-t-butyl-2-hydroxyphenyl)-5-chlorobenzotriazole
[7] Pentaerythrityl-tetrakis[3-(3,5-di-t-butyl-4-hydroxyphenyl)propionate]
[8] Bis(2,2,6,6-tetramethyl-4-piperidyl)sebacate
[9] Mineral spirit solution of iron 2-ethylhexanoate, metal (Fe) content: 6%
[10] Mineral spirit solution of iron naphthenate, metal (Fe) content: 5%
[11] Toluene solution of titanium 2-ethylhexanoate, metal (Ti) content: 3%
[12] Toluene solution of vanadium naphthenate, metal (V) content: 2%
[13] Mineral spirit solution of calcium 2-ethylhexanoate, metal (Ca) content: 5%
[14] Toluene solution of barium 2-ethylhexanoate, metal (Ba) content: 8%
[15] Mineral spirit solution of manganese 2-ethylhexanoate, metal (Mn) content: 8%
[16] Toluene solution of nickel 2-ethylhexanoate, metal (Ni) content: 6%
[17] Mineral spirit solution of cobalt 2-ethylhexanoate, metal (Co) content: 12%
[18] Mineral spirit solution of zirconium 2-ethylhexanoate, metal (Zr) content: 12%
[19] Zinc 2-ethylhexanoate, metal (Zn) content: 18%

As shown in Table 4, in case of Examples 16 to 28 using various carboxylic acid metal salts, the surface was cured after 5 days despite the use of a tin-free silanol condensation catalyst and the resulting compositions exhibited practical curability. In case of Comparative Example 4 using zinc carboxylate, the surface was uncured even after 5 days because of poor curability.

As is apparent from the above description, the curable composition comprising (A) an organic polymer having at least one reactive silicon group in the molecule and (B) one or more carboxylic acid metal salts selected from calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate exhibits practical curability, despite the use of a tin-free catalyst, and also its cured article is excellent in physical properties (high elongation and high strength).

(Composition Having a Trimethoxysilyl Group as a Reactive) Silicon Group

When using a polyoxyalkylene polymer wherein a trimethoxysilyl group as a reactive silicon group exists in the molecular chain ends, the curing rate increases as compared with the polymer of Synthesis Example 1. This is because the trimethoxysilyl group has reactivity higher than that of the methyldimethoxysilyl group. Such a polymer is described in Japanese Kokai Publication No. Hei-11-12480 and Japanese Kokai Publication No. 2001-72855. For example, the same curable composition as those of Examples 6 to 15 can be prepared by using the polymer described in Preparation Example 1 of Japanese Kokai Publication No. Hei-11-12480. Tack-free time of this composition is shorter than that of the compositions of Examples 6 to 15. Also the same curable composition as those of Examples 6 to 15 can be prepared by using the polymers described in Preparation Examples 1–4 of Japanese Kokai Publication No. 2001-72855. Tack-free time of this composition is shorter than that of the compositions of Examples 6 to 15. Therefore, if the curing time is the same, the amount of the catalyst can be decreased when using the above polymer having a trimethoxysilyl group.

Furthermore, when using a mixture of a polymer having a trimethoxysilyl group and a polymer having a methyldimethoxysilyl group as the polymer, the curing time and physical properties of the cured article can be freely controlled. For example, the curable compositions of Examples 6 to 15 can be prepared by using a polymer prepared by mixing the polymer having a trimethoxysilyl group with the polymer having a methyldimethoxysilyl group as the polymer in a weight ratio of 1:10 to 10:1.

Example wherein a polymer having a trimethoxysilyl group is used will be described below.

SYNTHESIS EXAMPLE 3

In a 1 L autoclave in an $N_2$ atmosphere, 19 g of γ-isocyanatepropyltrimethoxysilane (manufactured by Nippon Unicar Co., Ltd. under the trade name of Y-5187) and 0.05 g of dibutyltin bisisooctyl thioglycolate (manufactured by Nitto Kasei Co., Ltd. under the trade name of U-360) as a catalyst were added to 1000 g of polyoxypropylenediol having a number average molecular weight of 17,000 and a molecular weight distribution Mw/Mn of 1.20 obtained by polymerizing polypropylene oxide in the presence of a metal complex catalyst and the mixture was reacted in a nitrogen gas flow at 90° C. until an isocyanate group is not detected by IR to obtain a reactive silicon group-containing polyoxypropylene (A-3) wherein a trimethoxysilyl group is introduced into about 80% of the ends.

EXAMPLES 29 to 32

The polyoxyalkylene polymer (A-1) having a methyldimethoxysilyl group obtained in Synthesis Example 1 and the polyoxyalkylene polymer (A-3) having a trimethoxysilyl group obtained in Synthesis Example 3 as the component (A), and various carboxylic acid metal salts as the component (B) and laurylamine as the component (C), each weighed according to the formulation shown in Table 5, were mixed with stirring using a spatula for 30 seconds. Various carboxylic acid metal salts as the component (B) were added so that the mole number of metal atoms contained may be the same. After mixing, the time required to cure the composition so that the composition does not adhere to a spatula even when slightly pressed the surface using the spatula (skinning time) was measured.

The evaluation results are shown in Table 5.

TABLE 5

| | | | Examples | | | |
|---|---|---|---|---|---|---|
| Composition (parts by weight) | | | 29 | 30 | 31 | 32 |
| Component (A) | | A-1 | 100 | | 100 | |
| | | A-3 | | 100 | | 100 |
| Component (B) | Nikkaoctix 6% iron (T)[1] | NIHON KAGAKU SANGYO CO., LTD. | 6.6 | 6.6 | | |
| | Nikkaoctix 5% calcium (T)[2] | NIHON KAGAKU SANGYO CO., LTD. | | | 5.6 | 5.6 |
| Component (C) | | Laurylamine | 0.66 | 0.66 | 0.66 | 0.66 |
| | Skinning time (at 23° C.) | | 41 min | 21 min | not less than 300 min | 105 min |

[1]Mineral spirit solution of iron 2-ethylhexanoate, metal (Fe) content: 6%

[2]Mineral spirit solution of calcium naphthenate, metal (Ca) content: 5%

As shown in Table 5, the polyoxyalkylene polymer having a trimethoxysilyl group (A-3: Examples 30 and 32) exhibited a curing rate higher than that of the polyoxyalkylene polymer having a group (A-1: Examples 29 and 31).

The same curable compositions as those of Examples 6 to 15 can be prepared by using the polyoxyalkylene polymer having a trimethoxysilyl group (A-3) obtained in Synthesis Example 3. The resulting composition is excellent in physical properties because of short curing time (tack-free time).

(Composition Using an Epoxy Resin in Combination)

The same curable compositions as those of Examples 6 to 15 can be prepared by using a composition which uses a reactive silicon group-containing organic polymer in combination with an epoxy resin. When using this composition, adhesive strength is achieved rapidly.

INDUSTRIAL APPLICABILITY

A curable composition, which comprises components (A) and (B) described below; (A) an organic polymer containing at least one silicon-containing group which has a hydroxyl or hydrolyzable group bonded to the silicon atom and which is crosslinkable by forming siloxane bonds, and (B) one or more carboxylic acid metal salts selected from the group consisting of calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate, exhibits curability suited for practical use and recovery properties, and also the resulting cured article exhibits mechanical properties such as high strength and high elongation as compared with the case of using carboxylic acid tin which has conventionally been used as curing catalyst. Therefore, the curable composition of the present invention is remarkably suited for use as various elastomers for sealing materials, adhesives and tackifiers.

The invention claimed is:

1. A curable composition comprising components (A), (B), and (C) described below;
    (A) an organic polymer containing at least one silicon-containing group which has a hydroxyl or hydrolyzable group bonded to the silicon atom and which is crosslinkable by forming siloxane bonds,
    (B) one or more carboxylic acid metal salts selected from the group consisting of calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate, and
    (C) an amine compound,
    wherein the organic polymer as the component (A) has a number average molecular weight within a range from 500 to 50,000 and also has one or more hydrolyzable silyl groups represented by the general formula (1):

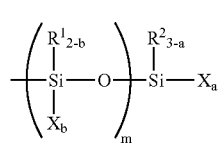

(1)

wherein $R^1$ and $R^2$ each independently represents an alkyl group having 1 to 20 carbon atoms, an aryl group having 6 to 20 carbon atoms, an aralkyl group having 7 to 20 carbon atoms, or a triorganosiloxy group represented by $(R')_3SiO—$ ($R'$ each independently represents a substituted or non-substituted hydrocarbon group having 1 to 20 carbon atoms); X each independently represents an alkoxy group; a represents 0, 1, 2 or 3; b represents 0, 1 or 2, and a and b do not become 0 simultaneously; and m is 0 or an integer of 1 to 19, per molecule in the main chain ends and/or the side chains,
    wherein the organic polymer as the component (A) is a polyoxyalkylene polymer and/or a saturated hydrocarbon polymer,
    wherein the saturated hydrocarbon polymer contains a repeating unit originating in isobutylene in the total amount of 50% by weight or more.

2. The curable composition according to claim 1, wherein calcium carboxylate, vanadium carboxylate, iron carboxylate, titanium carboxylate, potassium carboxylate, barium carboxylate, manganese carboxylate, nickel carboxylate, cobalt carboxylate and zirconium carboxylate as the component (B) respectively contain carboxylic acid metal salts represented by the general formulas (2) to (12):

$$Ca(OCOR)_2 \qquad (2)$$

$$V(OCOR)_3 \qquad (3)$$

$$Fe(OCOR)_2 \qquad (4)$$

$$Fe(OCOR)_3 \qquad (5)$$

$$Ti(OCOR)_4 \qquad (6)$$

$$K(OCOR) \qquad (7)$$

$$Ba(OCOR)_2 \qquad (8)$$

$$Mn(OCOR)_2 \qquad (9)$$

$$Ni(OCOR)_2 \qquad (10)$$

$$Co(OCOR)_2 \qquad (11)$$

$$Zr(O)(OCOR)_2 \qquad (12)$$

wherein R represents a substituted or non-substituted hydrocarbon group and may contain a carbon-carbon double bond.

3. The curable composition according to claim 1, wherein the carboxylic acid metal salt as the component (B) is prepared from a carboxylic acid having a melting point of 65° C. or lower.

4. The curable composition according to claim 1, wherein the carboxylic acid metal salt as the component (B) is prepared from a carboxylic acid having 2 to 17 carbon atoms.

5. The curable composition according to claim 1, wherein the carboxylic acid metal salt as the component (B) is a metal salt of a carboxylic acid group-containing compound selected from octylic acid, 2-ethylhexanoic acid, neodecanoic acid, oleic acid and naphthenic acid.

6. The curable composition according to claim 1, which contains the component (B) in the amount of 0.005 to 5 parts by weight in terms of a metallic element contained in the component (B) based on 100 parts by weight of the component (A).

7. The curable composition according to claim 1, which contains the component (B) in the amount of 0.005 to 5 parts by weight in terms of a metallic element contained in the component (B) based on 100 parts by weight of the component (A), and the component (C) in the amount of 0.01 to 20 parts by weight.

8. The curable composition according to claim 1, wherein the amine compound is selected from aliphatic primary amines or aliphatic secondary amines.

* * * * *

UNITED STATES PATENT AND TRADEMARK OFFICE
CERTIFICATE OF CORRECTION

| | |
|---|---|
| PATENT NO. | : 7,115,695 B2 |
| APPLICATION NO. | : 10/482872 |
| DATED | : October 3, 2006 |
| INVENTOR(S) | : Okamoto et al. |

It is certified that error appears in the above-identified patent and that said Letters Patent is hereby corrected as shown below:

On the title page, item [56], under References Cited:

U.S. PATENT DOCUMENTS, please add:

--6,107,413 A * 8/2000 Mori et al......................525/342-- in place of:

"6,017,413 A * 1/2000 Franklin et al..................156/304.2"

FOREIGN PATENT DOCUMENTS, please delete:

"EP 290388 * 12/1997"

Column 1, line 61, "bisacetylacetonate" should be changed to --bis(acetylacetonate)--;
Column 2, line 25, "studied intensively" should be changed to --intensive study--;
Column 2, line 61, "to aforementioned" should be changed to --to the aforementioned--;
Column 3, line 24, "As more preferable" should be changed to --As a more preferable--;
Column 3, line 25, "to aforementioned" should be change to --to the aforementioned--;
Column 3, line 27, "As more preferable" should be changed to --As a more preferable--;
Column 3, line 28, "to aforementioned" should be changed to --to the aforementioned--;
Column 3, line 32, "As more preferable" should be changed to --As a more preferable--;
Column 3, line 33, "to aforementioned" should be changed to --to the aforementioned--;
Column 3, line 37, "As more preferable" should be changed to --As a more preferable--;
Column 3, line 38, "to aforementioned" should be changed to --to the aforementioned--;
Column 4, line 1, "As more preferable" should be changed to --As a more preferable--;
Column 4, line 2, "to aforementioned" should be changed to --to the aforementioned--;
Column 4, line 6, "As more preferable" should be changed to --As a more preferable--;
Column 4, line 7, "to aforementioned" should be changed to --to the aforementioned--;
Column 4, line 12, "As more preferable" should be changed to --As a more preferable--;
Column 4, line 13, "to aforementioned" should be changed to --to the aforementioned--;
Column 4, line 18, "As more preferable" should be changed to --As a more preferable--;
Column 4, line 19, "to aforementioned" should be changed to --to the aforementioned--;
Column 4, line 24, "As more preferable" should be changed to --As a more preferable--;
Column 4, line 25, "to aforementioned" should be changed to --to the aforementioned--;
Column 4, line 44, "copolyme" should be changed to --copolymer--;
Column 5, line 12, "in present" should be changed to --in the present--;
Column 6, line 31, "followings." should be changed to --following.--;
Column 7, line 36, "preferably" should be changed to --preferable--;

UNITED STATES PATENT AND TRADEMARK OFFICE
CERTIFICATE OF CORRECTION

PATENT NO. : 7,115,695 B2
APPLICATION NO. : 10/482872
DATED : October 3, 2006
INVENTOR(S) : Okamoto et al.

It is certified that error appears in the above-identified patent and that said Letters Patent is hereby corrected as shown below:

Column 10, line 16, "Then, the" should be changed to --The--;
Column 11, line 4, "preferably" should be changed to --preferable--;
Column 13, line 1, "a meth)acrylic acid" should be changed to --a (meth)acrylic acid--;
Column 14, lines 12-13, "so-called a" should be changed to --a so-called--;
Column 14, line 35, "contain," should be changed to --contains,--;
Column 15, line 57, "carbons" should be changed to --carbon--;
Column 17, line 20, "shorten" should be changed to --short--;
Column 18, line 12, "γ-haminopropylmethyldimethoxysilane" should be changed to --γ-aminopropylmethyldimethoxysilane--;
Column 18, line 26, "coulping" should be changed to --coupling--;
Column 18, line 48, "shorten" should be changed to --short--;
Column 19, line 62, "plasticizer" should be changed to --plasticizers--;
Column 20, line 41, "anhdyrides" should be changed to --anhydrides--;
Column 20, line 42, "anhdyride" should be changed to --anhydride-- in both instances;
Column 20, line 43, "anhdyride" should be changed to --anhydride--;
Column 21, line 8, "photostabilizres" should be changed to --photostabilizers--;
Column 23, Table 1, line 17, "Disteaylamine" should be changed to --Distearylamine--;
Column 23, line 67, "by hands" should be changed to --by hand--;
Column 25, line 51, "is important" should be changed to --is an important--;
Column 31, line 1, "in case" should be changed to --in the case--;
Column 37, line 5, "In case" should be changed to --In the case--;
Column 37, line 20-21, "Reactive) Silicon Group" should be changed to --Reactive Silicon Group)--.

Signed and Sealed this

Thirtieth Day of September, 2008

JON W. DUDAS
*Director of the United States Patent and Trademark Office*